May 22, 1928.

K. O. B. TEXTORIUS 1,670,870

METHOD AND MACHINE FOR BUILDING CORD TIRES

Filed Oct. 8, 1924   15 Sheets-Sheet 2

INVENTOR
*Knut O.B.Textorius*
BY
his ATTORNEY

May 22, 1928.

K. O. B. TEXTORIUS 1,670,870

METHOD AND MACHINE FOR BUILDING CORD TIRES

Filed Oct. 8, 1924    15 Sheets-Sheet 3

INVENTOR
Knut O.B. Textorius
BY C. P. Goepel
his ATTORNEY

May 22, 1928.  1,670,870
K. O. B. TEXTORIUS
METHOD AND MACHINE FOR BUILDING CORD TIRES
Filed Oct. 8, 1924  15 Sheets-Sheet 7

INVENTOR
Knut O. B. Textorius
BY
his ATTORNEY

May 22, 1928.  
K. O. B. TEXTORIUS  
1,670,870  
METHOD AND MACHINE FOR BUILDING CORD TIRES  
Filed Oct. 8, 1924   15 Sheets-Sheet 8

INVENTOR  
Knut O.B.Textorius  
BY  
his ATTORNEY

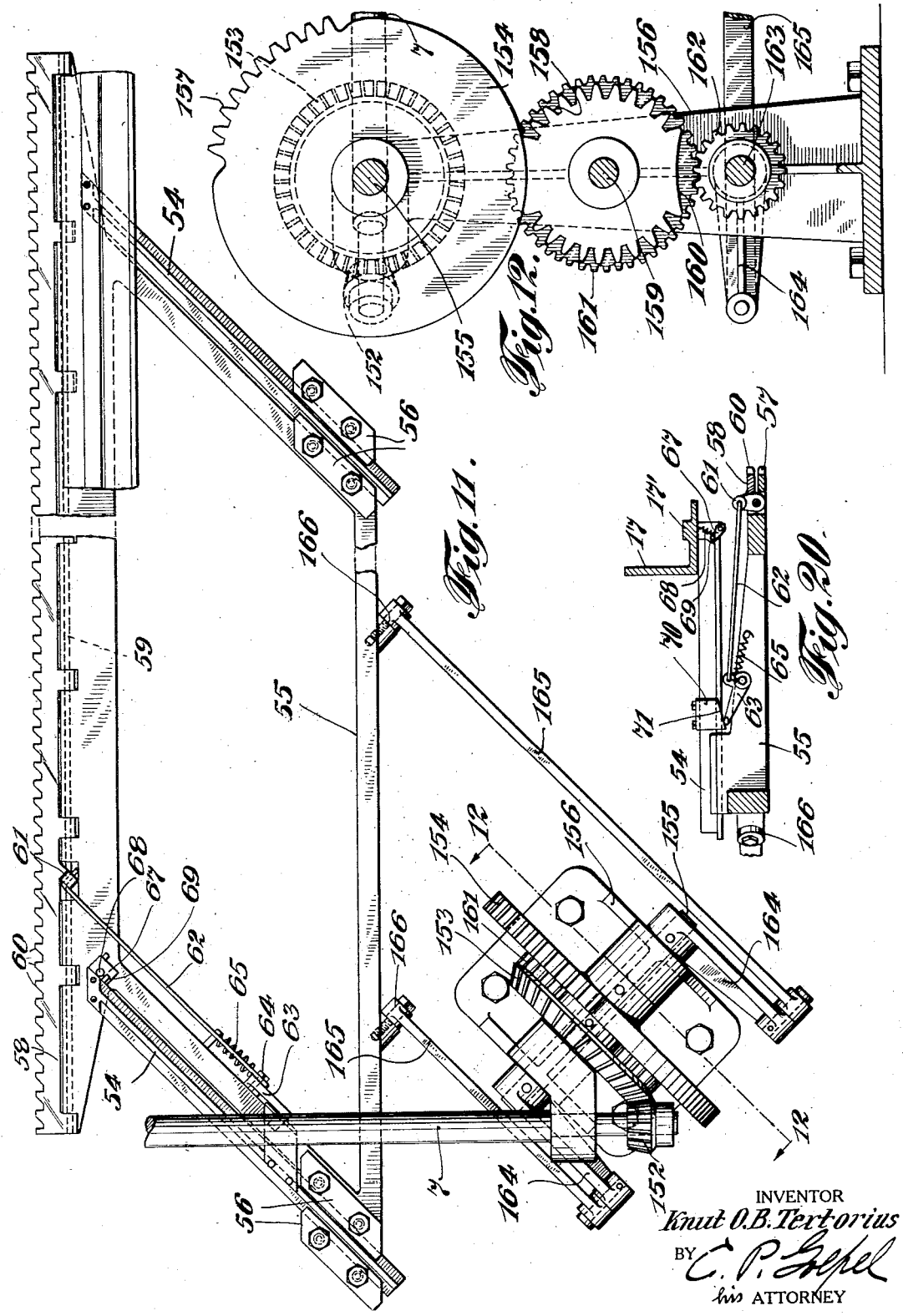

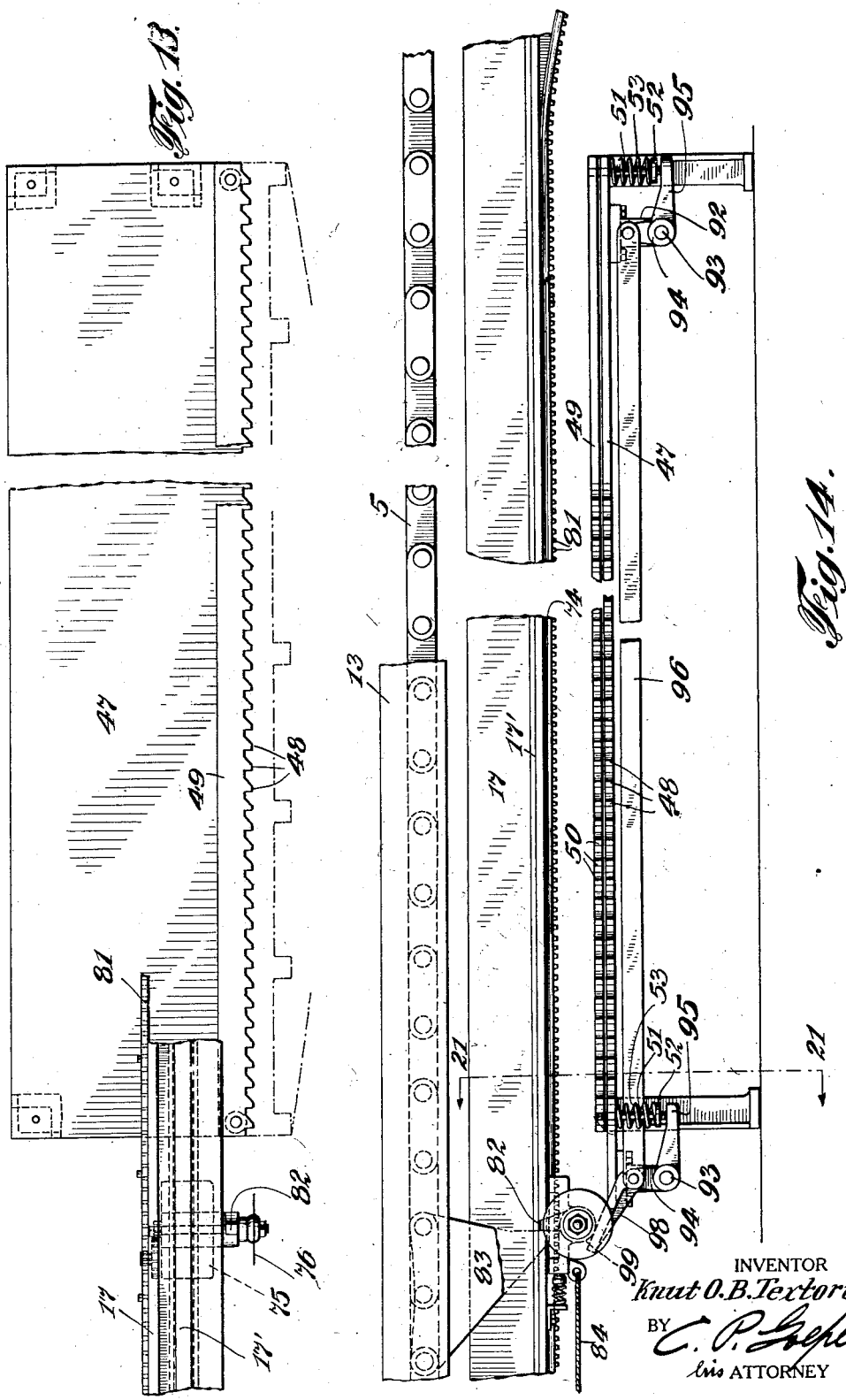

May 22, 1928. 1,670,870
K. O. B. TEXTORIUS
METHOD AND MACHINE FOR BUILDING CORD TIRES
Filed Oct. 8, 1924 15 Sheets-Sheet 11

INVENTOR
Knut O. B. Textorius
BY
his ATTORNEY

May 22, 1928.
K. O. B. TEXTORIUS
1,670,870
METHOD AND MACHINE FOR BUILDING CORD TIRES
Filed Oct. 8, 1924 15 Sheets-Sheet 12
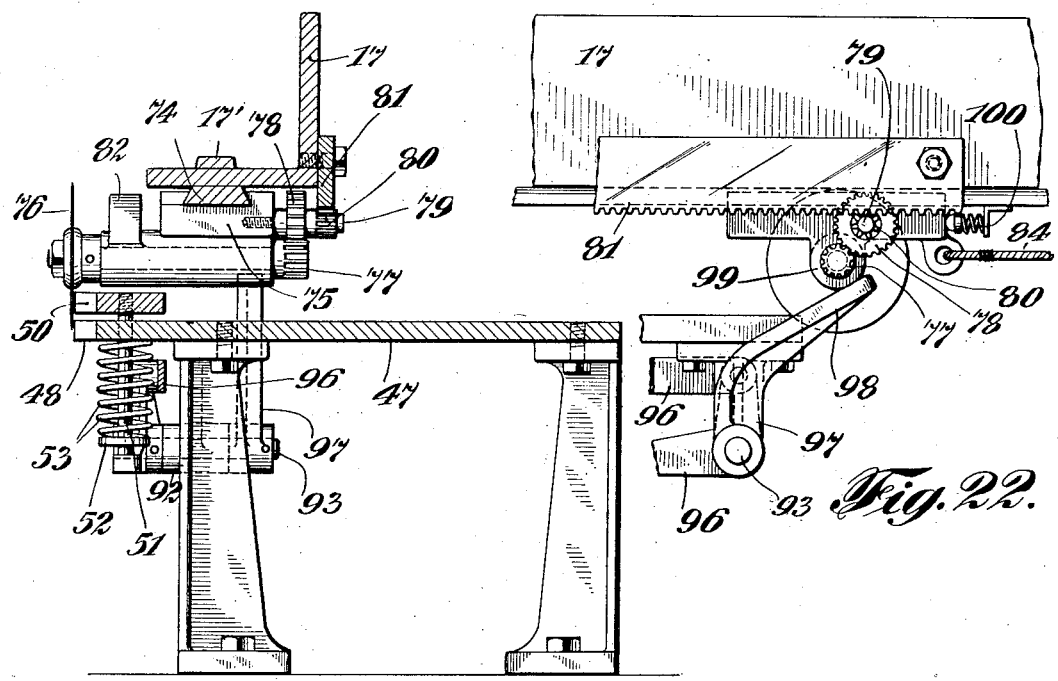
Fig. 21.
Fig. 22.
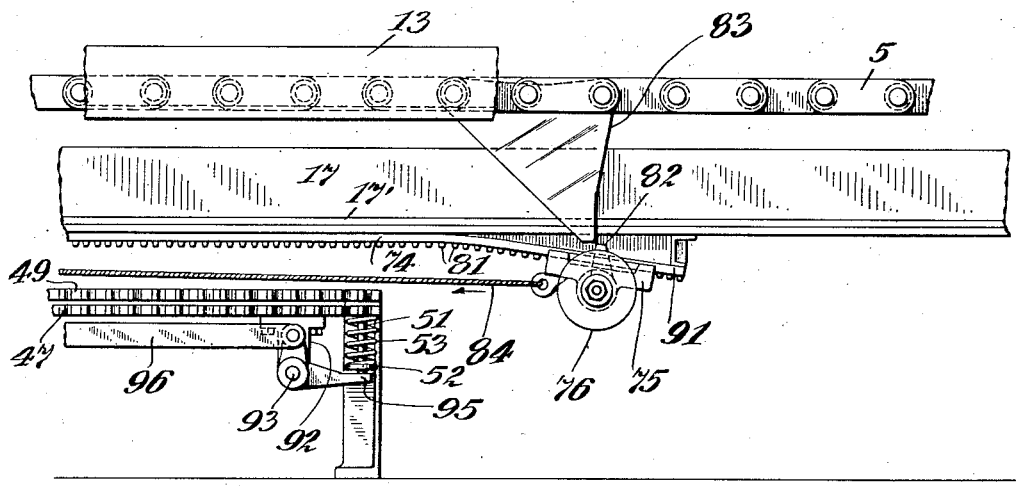
Fig. 23.
INVENTOR
Knut O. B. Textorius
BY
his ATTORNEY May 22, 1928.  1,670,870

K. O. B. TEXTORIUS

METHOD AND MACHINE FOR BUILDING CORD TIRES

Filed Oct. 8, 1924  15 Sheets-Sheet 13

INVENTOR
Knut O.B. Textorius
BY C. P. Goepel
his ATTORNEY

May 22, 1928. 1,670,870
K. O. B. TEXTORIUS
METHOD AND MACHINE FOR BUILDING CORD TIRES
Filed Oct. 8, 1924 15 Sheets-Sheet 14
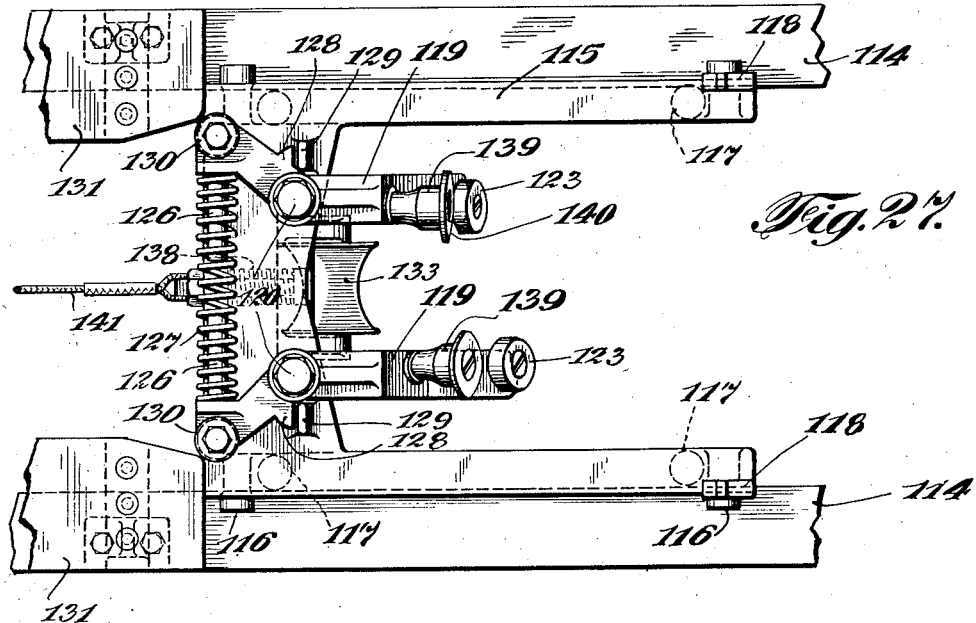
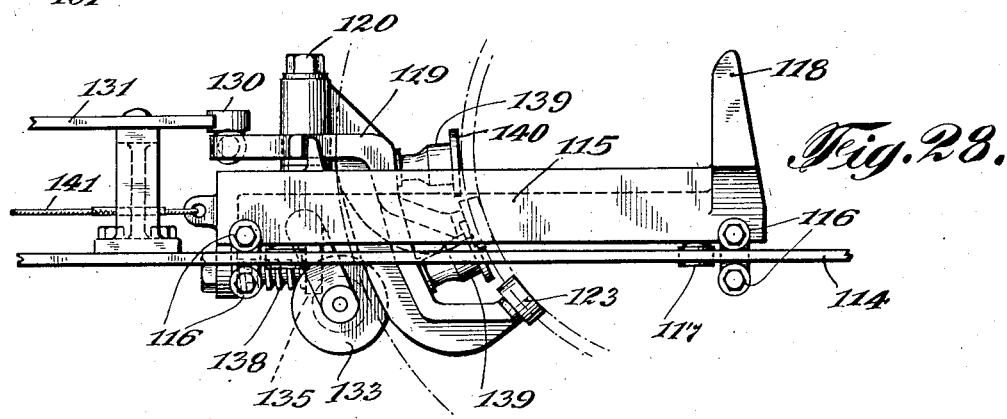
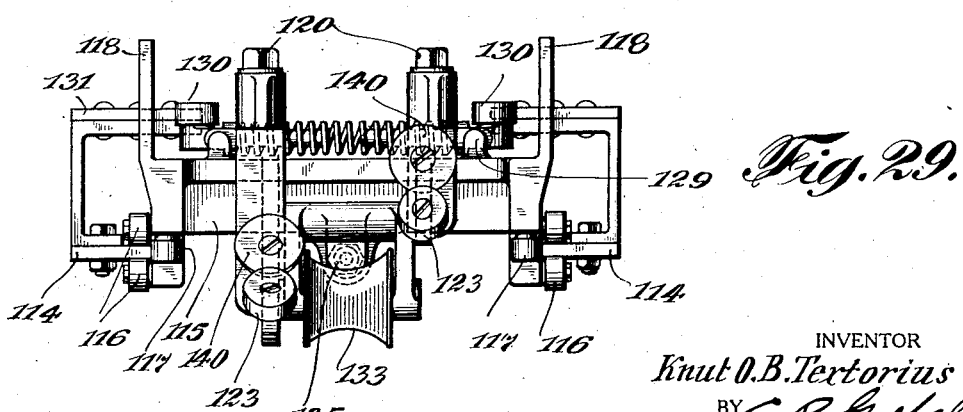
INVENTOR
Knut O.B. Textorius
BY C. P. Goepel
his ATTORNEY May 22, 1928.
K. O. B. TEXTORIUS
1,670,870
METHOD AND MACHINE FOR BUILDING CORD TIRES
Filed Oct. 8, 1924    15 Sheets-Sheet 15
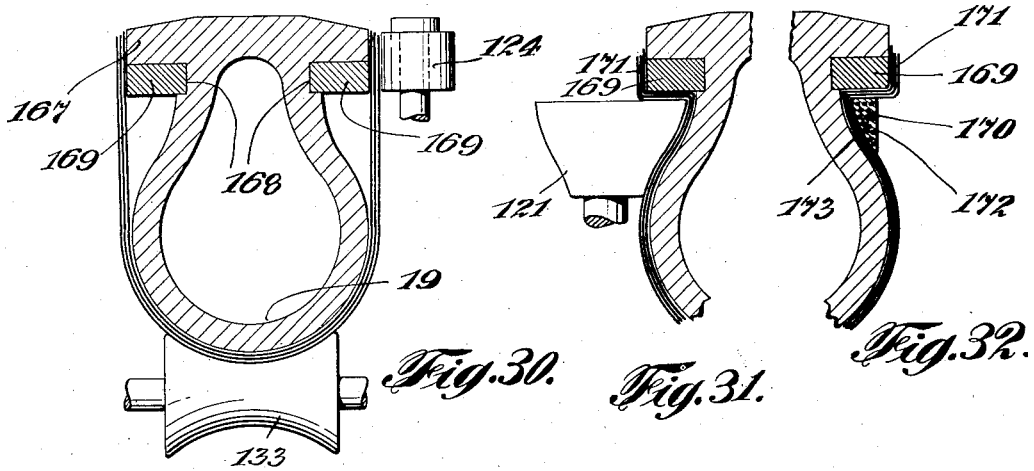
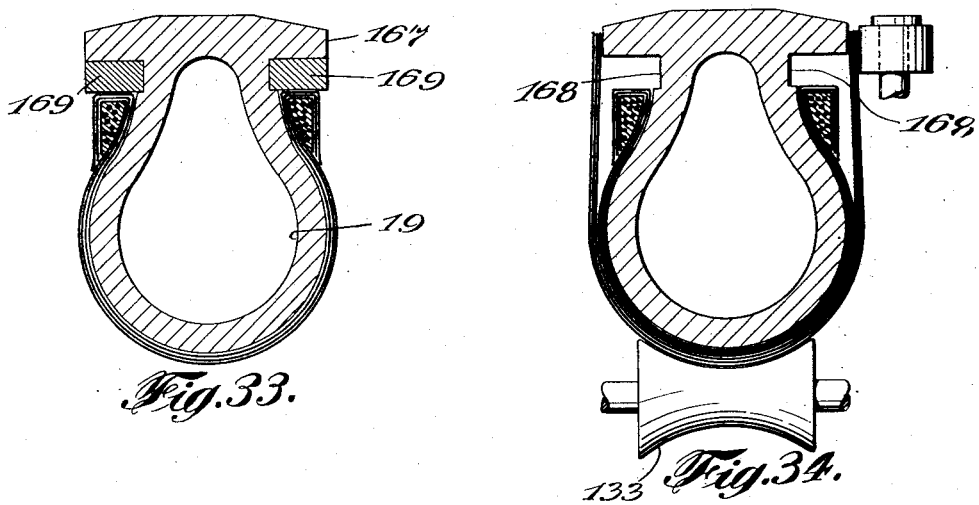
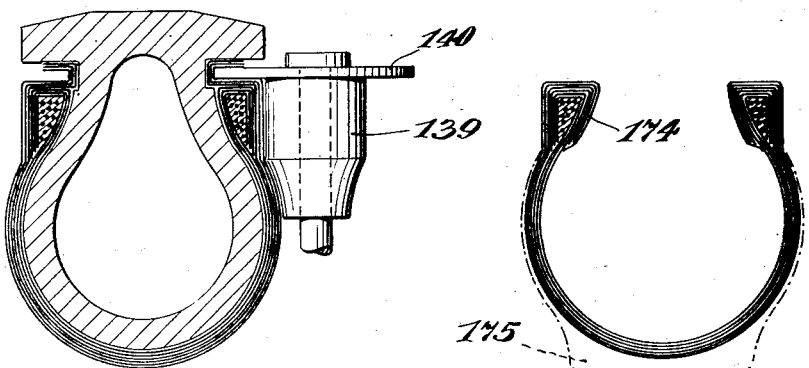
INVENTOR
Knut O. B. Textorius
BY C. P. Goepel
his ATTORNEY Patented May 22, 1928.

1,670,870

UNITED STATES PATENT OFFICE.

KNUT O. B. TEXTORIUS, OF NEW YORK, N. Y.

METHOD AND MACHINE FOR BUILDING CORD TIRES.

Application filed October 8, 1924. Serial No. 742,292.

This invention relates to an improved method and machine for building cord tires.

It is the primary object and purpose of my present invention to provide a new method of building a casing or carcass for pneumatic tires of that character wherein the carcass is composed primarily of a plurality of superimposed layers or plies of individual cords whereby the quantity production of such cord tires may be greatly expedited in comparison with production possibilities of the methods of building or constructing such tires as now generally employed.

It is another object of my invention to provide a relatively simple and novel machine or apparatus which is entirely automatic in its action and wherein all manual labor is eliminated from the time the core or mandrel is placed in position in the machine until the core is finally delivered therefrom with the desired number of superimposed layers or plies of cords thereon.

My improved method is primarily characterized by the fact that the individual cord layers or plies are cut from a sheet of such cords drawn from a reel, said section of the cord sheet being of a length equivalent to the circumferential length of the core or mandrel and of a width equivalent to the transverse surface extent of such core, said section of the cord sheet being supported upon a yieldable track, and then rolling the core or mandrel in a perpendicular position upon said cord section or layer and simultaneously folding the lateral edges thereof inwardly upon the sides of the core. The cord sheet is drawn from the reel and the section cut therefrom so that the cords of said section or layer when applied to the surface of the core will lie at an angle of substantially 45° with respect to the core axis. In applying the next layer of cords, the cord sheet is drawn from a second reel in the reverse direction so that the cords of the second layer when applied will also lie at an angle of 45° with respect to the core axis, but will extend across the core at right angles with respect to the cords of the preceding layer.

It is a further novel feature of my present method to apply bead rings at opposite sides of the core after a predetermined number of cord layers have been arranged thereon and fold the edges of said cord layers outwardly over the bead rings, and then apply an additional predetermined number of cord layers in the manner above described and fold the edges of the latter cord layers in an inward direction upon the bead ring edges of the previously applied cord layers. In this manner I aim to secure substantially uniform tension of the cords, comprising the several layers of plies and also obtain a very secure connection of the edges of the cord layers with the bead rings and a uniform application of strain to the bead rings after vulcanization in the completed tire structure.

The improved machine is primarily characterized by the fact that said machine consists of a plurality of like units corresponding in number to the number of cord plies or layers to be built up on the core or mandrel, each of said machine units operating automatically to apply a single layer of cords, and means associated with said machine units for automatically handling the cores and transferring the same from one unit to the other as the cord layers are successively applied.

My present improvements likewise comprehend improved means for automatically controlling the gravity feed of the cores to the first machine unit of the series, improved means for tensioning the cords against the sides of the core or mandrel, and means for preventing sticking of the rubber composition with which the cords are coated to the yieldable base or track upon which the core is rolled during the application of the cords thereto.

It is also an important object of my present invention to provide an improved construction of the core or mandrel and means to be detachably associated therewith whereby the bead rings may be applied to the edges of the cord layers in the manner above described.

In general, the subject matter of the present application provides a method which may be carried out in practice by an apparatus or machine which is of comparatively simple construction, may be produced at nominal cost, is positive and reliable in the performance of its several functions and will operate to produce such cord tires of a superior quality and with greater rapidity than is now possible in the art.

With the above and other objects in view, the invention consists in the improved method and machine for building cord tires, and in the novel features of the tire structure produced thereby as will be hereinafter more fully described, illustrated in the accompanying drawings and subsequently incorporated in the subjoined claims.

In the drawings wherein I have illustrated one embodiment of a machine or apparatus for carrying out the present invention, and in which similar reference characters designate corresponding parts throughout the several views, Figures 1 and 1ᵃ are plan views of two sections of the machine or apparatus;

Figures 2 and 2ᵃ are side elevations of the same two units or sections of the machine;

Figure 11 is a plan view of the essential parts of the cord sheet feeding mechanism;

Figure 12 is a sectional view taken on the line 12—12 of Figure 11;

Figure 13 is a plan view of the stationary bed over which the cord sheet is drawn and showing the relative position of the traveling cutter;

Figure 14 is an elevation of the parts seen in Figure 13 and showing the means for clamping each of the cord sheets upon said bed plate and for actuating said clamping means to release the cord sheet;

Figure 20 is a similar view illustrating a slightly modified form of the releasing device for the cord gripping or clamping means;

Figure 21 is a transverse sectional view showing the mounting and operating means for the rotary cord sheet cutter;

Figure 22 is a fragmentary side elevation illustrating the manner of operating the cord sheet clamping bar when the cutter is returned to its normal position;

Figure 23 is a detail side elevation illustrating the manner in which the operative connection between the cutter and the arm on the core conveyor chain is destroyed at the end of the cutting operation;

Figure 27 is a view similar to Figure 24, illustrating another form of the shaping and tensioning rollers which are employed after a predetermined number of cord layers have been assembled with the bead rings;

Figure 28 is a view similar to Figure 25, illustrating the rollers of the latter form;

Figure 29 is a front elevation thereof;

Figure 30 is a transverse section through the core or mandrel illustrating the manner of coaction of certain of the rollers shown in Figures 24, 25 and 26 to cause the edge portions of the cord layers to adhere to each other and against the core flanges;

Figure 31 is a fragmentary sectional view of the core showing the manner in which the successively applied cord layers are tensioned;

Figure 32 is a view similar to Fig. 31, illustrating the application of a bead ring after a predetermined number of cord layers have been applied;

Figure 33 is a view similar to Figure 30, showing the two bead rings applied and the edge portions of the cord layers turned outwardly around said bead rings;

Figure 34 is a sectional view of the core similar to Figure 30, but with certain parts removed and showing the additional cord layers applied;

Figure 35 is a view similar to Fig. 34, showing the manner of tensioning the latter series of cord layers and folding them inwardly over the bead edges of the preceding layers; and Figure 36 is a transverse section of the completed tire structure with the edge portions of the last applied cord layers extending upon the inner sides of the bead edges and in condition for vulcanizing.

Figure 1:
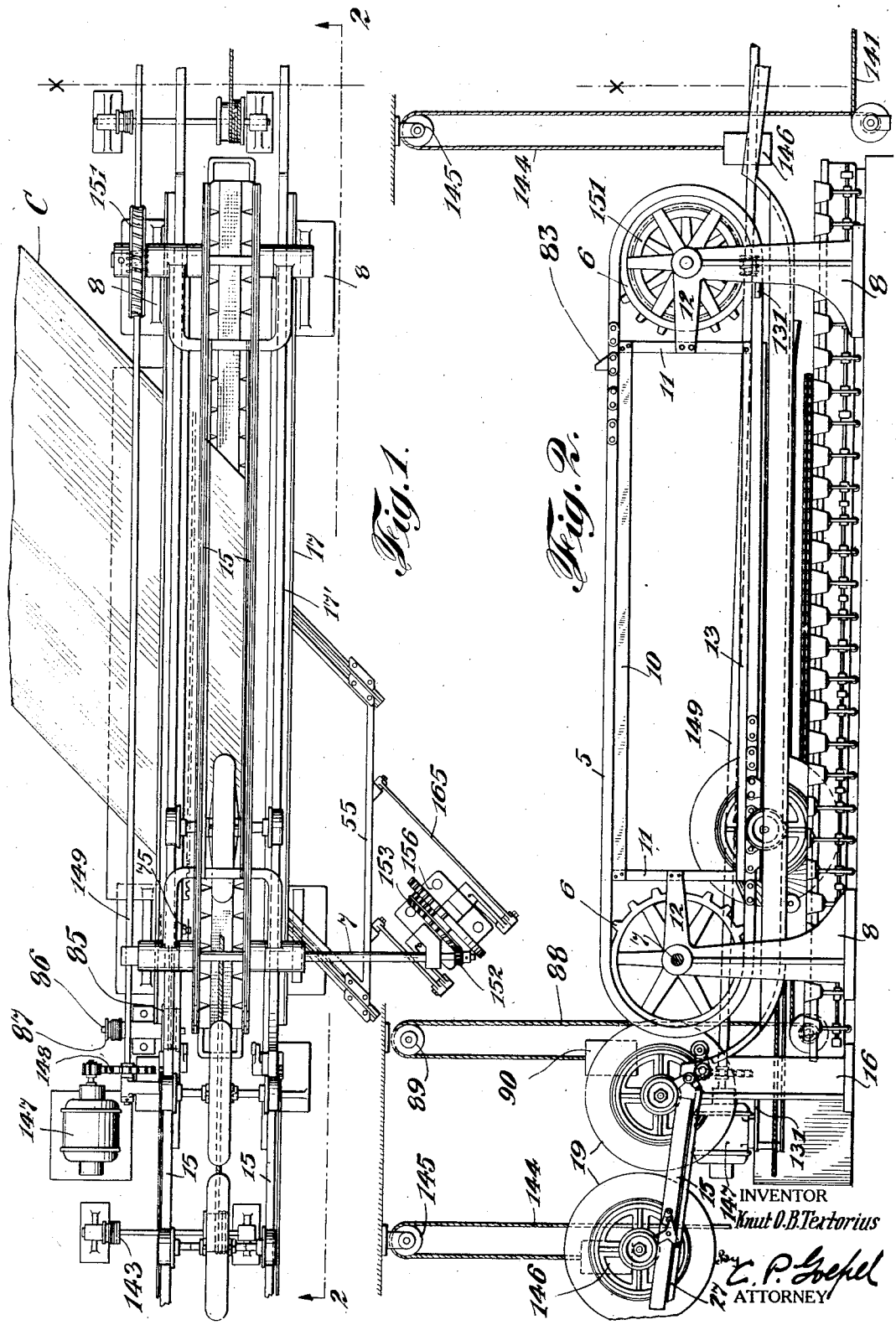

For purposes of illustration, I have shown in the accompanying drawings, a simple and practical embodiment of apparatus whereby my new method of building cord tires may be successfully practiced. This machine or apparatus in general, consists of a series of similar units, corresponding in number to the number of layers or plies of cords to be incorporated in the structure of the tire shoe, casing or carcass, as it is variously termed in the art. For convenience of description, the prominent co-operating sub-mechanisms of which the machine or apparatus is composed, may be referred to as the core handling mechanism, cord sheet feeding and cutting mechanism, cord folding and tensioning means and the operating mechanism. I shall, therefore, first describe in detail each of these sub-mechanisms in the order just stated, and then describe their conjoint operation, whereby the structure of the tire casing or carcass is built up in accordance with my new method. Subsequently, I shall also describe other novel features of the present disclosure, such as the tire core or mandrel, and the improved form and construction of the bead edges of the tire casing.

*Core handling mechanism.*

The machine or apparatus is designed to successively and automatically apply a predetermined number of plies or layers of cords successively upon a tire forming core or mandrel in a continuous operation and without manual intervention of any kind. Therefore, as heretofore observed, the entire machine or apparatus is composed of a series or plurality of like units synchronized in their operation so that each unit functions to carry out the same method step or operation at the same time.

Each of these machine units includes a pair of spaced endless sprocket link chains 5 trained over the sprocket wheels 6 fixed upon spaced transverse shafts or axles 7 journaled in the bearing standards or uprights 8 which are suitably anchored at their lower ends to the floor or bed. Suitable anti-friction rollers, as shown at 9, are loosely engaged upon the pivot pin connections between the parallel link members of the respective chains 5 and said rollers of the upper stretches of said chains travel upon the upper edges of the longitudinal bars 10 which are connected to each other at their opposite ends and supported by vertical frame members 11 suitably fixed to arms 12 projecting horizontally from the upper ends of the bearing standards 8. To the lower ends of the frame members 11 longitudinal bars 13 are fixed, the lower edges thereof being formed with track flanges 14 upon which the rollers 9 of the lower stretches of the endless chains 5 travel.

In Figures 1, 1ª and 2, 2ª of the drawings I have shown the first two of the machine units in the series, the remainder corresponding with the units illustrated in Figures 1ª, 2ª. Longitudinally inclined core supporting tracks 15 lead to the first of the machine units and are mounted at their opposite ends upon suitable standards such as is indicated at 16. These track rails may be of any desired length but preferably, should be capable of receiving at one time a number of cores corresponding to the number of the machine sections or units.

To the inner sides of the standards 8, the longitudinally extending angular track rails 17 are fixed, said rails at their opposite ends having their horizontal flanges upwardly extended and secured or mounted upon the standards 16, 16'. The upwardly curved right hand ends of the rails for the first machine unit are connected with the standard 16' by the inclined track rails 15' leading to the next machine unit. These horizontal flanges on their upper surfaces are provided with treads 17' for the carriage wheels to be presently referred to.

Figure 5:
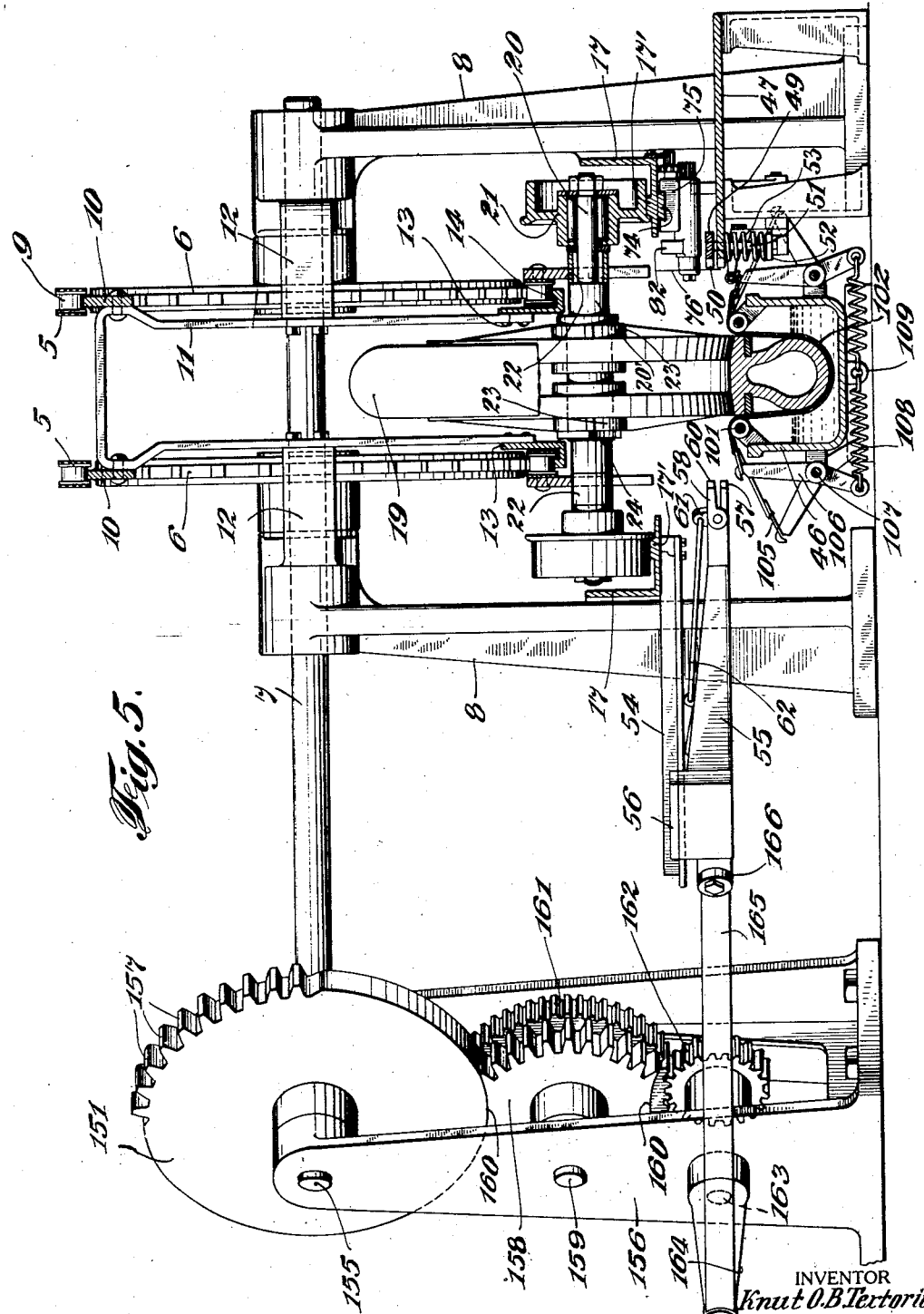
Figure 5 is a transverse sectional view showing the manner of supporting the traveling core for rolling movement upon the flexible track and also illustrating the cord sheet feeding and cutting mechanism.
Figure 6:
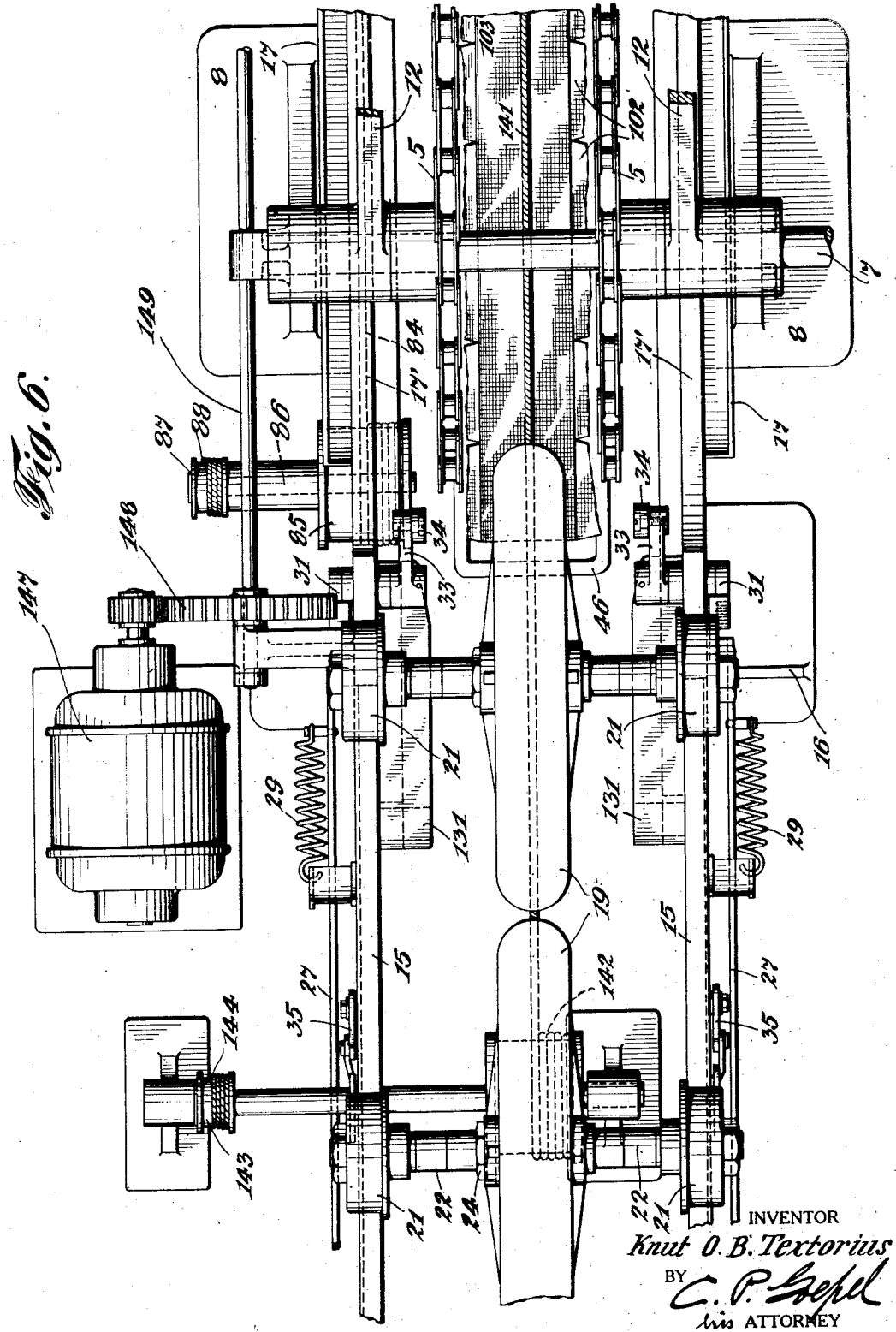
Figure 6 is a plan view of the mechanism illustrated in Figure 3 of the drawings.

As shown in Figure 5 of the drawings, each of the tire forming cores or mandrels 19 is mounted in a carriage, said carriage including an axle 20 extending centrally through the core and having flanged wheels 21 mounted on its opposite ends. The axle 20 at the inner side of each wheel 21 is surrounded by a roller bearing 22. On shaft part 20' an axially movable clamping head 23 is mounted. Nuts 24 are threaded upon the shaft parts 20' to engage with the other sides of the hubs of the clamping heads 23 and move said heads into tight clamping engagement against the opposite sides of the core 19.

Figure 3:
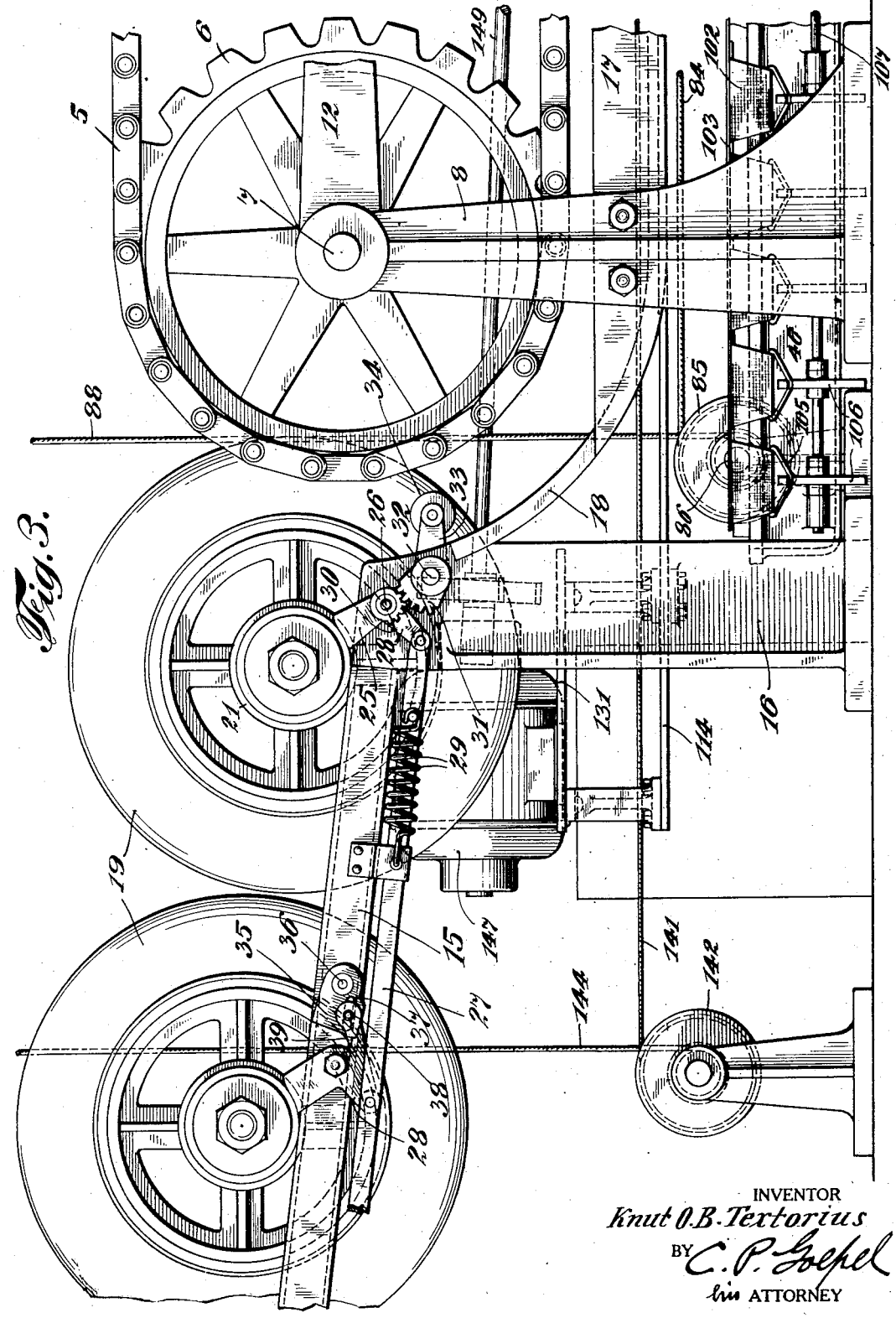
Figure 3 is an enlarged fragmentary side elevation illustrating the essential parts of the core feeding mechanism.
Figure 10:
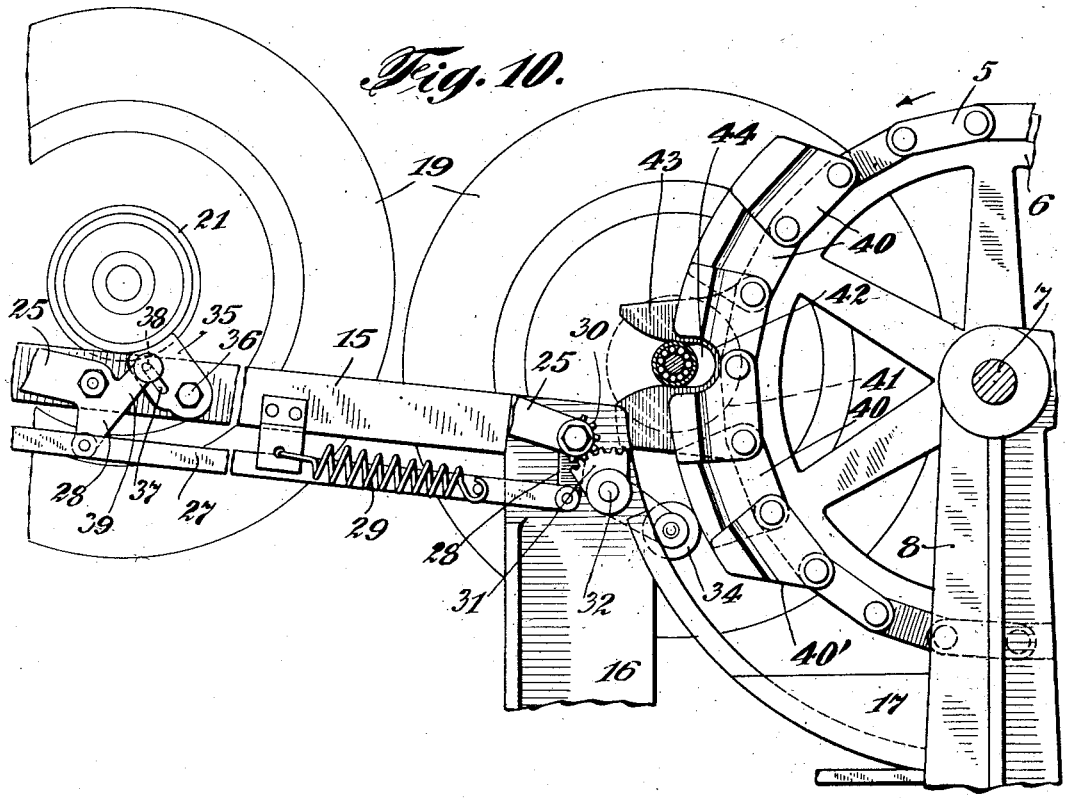
Figure 10 is an enlarged detail view of the core handling mechanism, showing the means for automatically releasing a core for gravity movement on the trackway, and the means on the track conveyor for supporting and directing the core and imparting a rolling movement thereto.

The series of cores or mandrels each provided with a carriage as above described, are supported for gravity rolling movement upon the track rails 15, and these cores are maintained out of contacting relation with each other and singly released and fed downwardly to the first machine unit by means of the mechanism illustrated more particularly in Figures 3 and 10 of the drawings. This automatic feeding mechanism for the cores includes longitudinally spaced stop dogs 25 pivotally mounted upon the outer side of each of the rails 15, as indicated at 26, the upper ends of said dogs normally projecting above the rails 15 and in the path of movement of the carriage wheels 21. The pivoted dogs 25 at each side of the machine are connected for simultaneous operation by a longitudinally extending bar 27 to which angular downwardly projecting arms 28 of said dogs are pivoted. This bar 27 is yieldingly held against movement in one direction to maintain the dogs 26 in their normal position by a spring 29.

Each of the dogs 25 nearest adjacent to the endless chains 5 of the first machine unit, is provided at its pivoted end with cog teeth 30 which are in mesh with the teeth of a rack 31 pivoted as at 32 on the upper end of one of the standards 16. This rack is provided with an arm 33 projecting from the pivot 32 towards the chains 5 and a suitable roller 34 is carried by this arm.

Each of the other dogs 25 with the exception of the ones next adjacent to the chains 5 has a second or supplemental stop dog 35 associated therewith which is pivoted as at 36 upon the track rail 15. This latter dog at one side of the pivot 36 is provided with a longitudinally extending slot 37 to receive a pin 38 fixed in an arm or extension 39 on the dog 25.

The sprocket chains 5 of the first machine unit have a series of free links in the form of relatively wide plates, indicated at 40 and 41 respectively, the intermediate or central plate 41 of the series being of greater length than the other plates and having a central recess or pocket 42 therein opening upon the outer edge of the plate. Each of the chains 5 also carries an outwardly projecting arm 43, said arm being associated with the plate 41 and having a central slot or recess 44 therein flaring or gradually increasing in width to its outer open end, as clearly shown in Figure 10 of the drawings. The operation of this automatic feed means for the cores may be explained as follows:

As the portions of the chains 5 which move in the direction indicated by the arrows in Figs. 3 and 10, having the plates 40, 41 thereon, move downwardly around the sprockets 5, the cam edges 40' of the plates 40 at one end of said series engage the rollers 34, thus moving the pivoted racks 31 from the position shown in Figure 3 to the position shown in Figure 10 and by the coaction of these racks with the cogs 30, the series of blocking dogs 25 for the carriage wheels 21 of the several cores are moved downwardly to the position seen in Figure 10 below the upper edges of the rails 15, thus releasing the core carriages for gravity movement upon said rails. However, the supplemental dogs 35 are simultaneously thrown upwardly to the position shown in Figure 10 and into the path of the carriage wheels 21 of the respective tire cores with the exception of the first core nearest to the chains 5. This core continues its rolling movement until the bearings 22 of its carriage are received in the slots 44 of the arms 43. The several dogs 35 are maintained in their effective positions by the engagement of the edges of the plates 40, 41 with the rollers 34. The outer sides of the bearings 22 are also positioned substantially in line with the outer edges of said plates so that the rollers 34 will contact with these bearings and prevent the return movement of said rollers 34 and the racks 33 to their normal positions until the outer edge of the last of the series of plates 40 has past beyond and out of contact with the rollers 34. At this time, the first or foremost core 19 has been carried downwardly by the chains 5 and the carriage wheels 21 are engaged upon the track rails 17. The springs 29 then return the bars 27 to their normal positions so that the dogs 25 are again moved to their effective positions in the path of the core carriage wheels, the several dogs 35 being simultaneously moved downwardly, thus releasing the cores for downward movement on the track rails until the carriage wheels thereof come into contact with the stop dogs 25.

Figure 2:
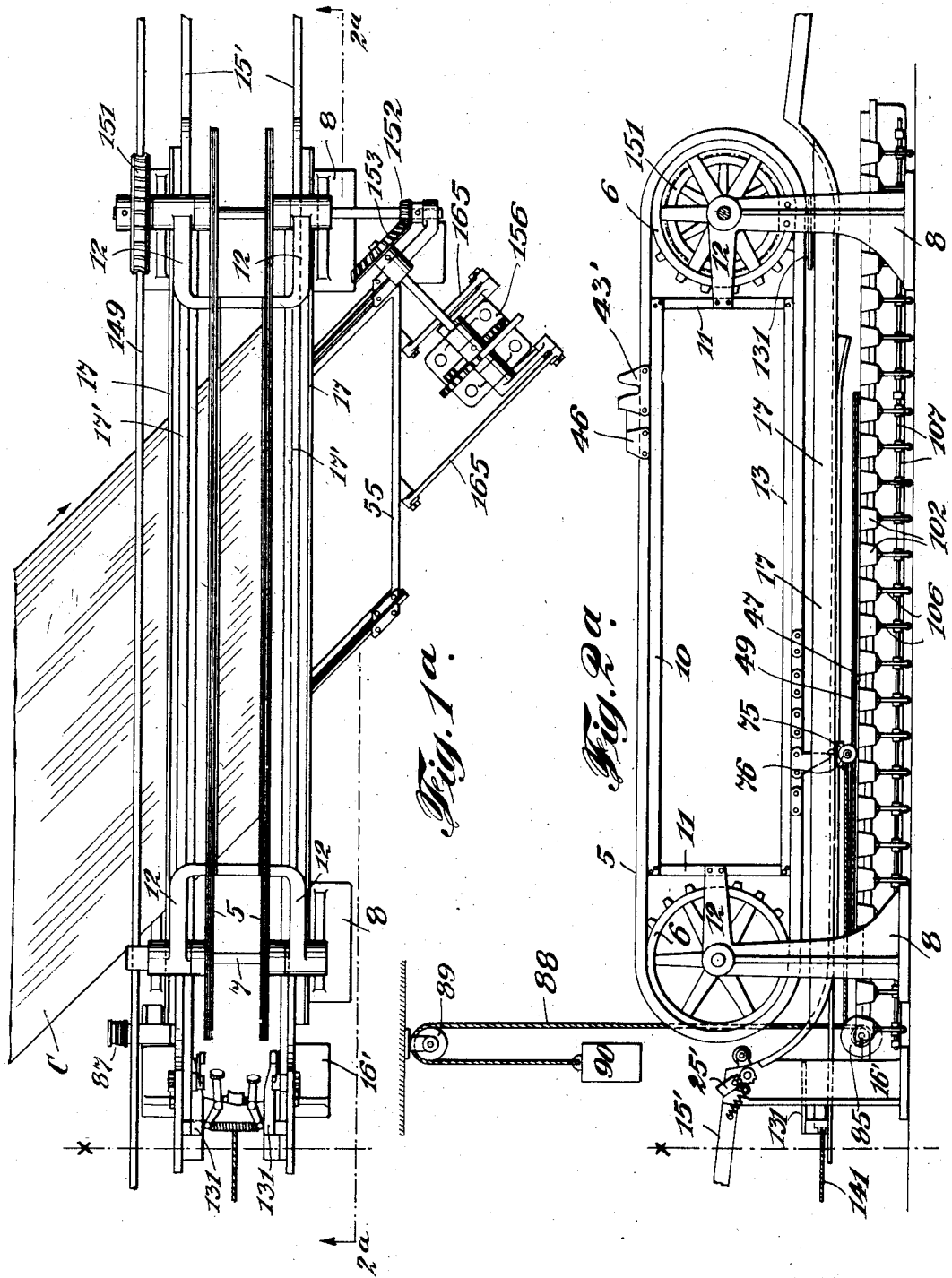

After the core has passed through the first machine unit and been provided with a single layer or ply of cords in the manner which I shall subsequently explain, the said core is delivered upon the track rails 15' and travels downwardly thereon until the carriage wheels engage the dogs 25' which are similar to the dogs 25 previously described. Since only a single core carriage is supported at a time on the rails 15', there are of course, only one pair of these dogs 25'. Said dogs are normally held in their effective positions and in the path of the carriage wheels by means of the springs 45 directly connected to said dogs. These dogs, however, are provided with the cog teeth and the pivoted racks and rollers for the actuation of said dogs identical with the corresponding parts used in connection with the initial feed mechanism as above explained are provided. The chains 5 of the succeeding machine units are not, however, provided with the series of plates 40, 41 above referred to, but as shown in Fig. 2ª of the drawings, these chains are merely provided with cam link plates 46 which need be only of sufficient length to actuate the racks 31 and hold the dogs 25' in released position until the carriage wheels of the core have past beyond said dogs. These chains are provided with the slotted arms 43' to receive the bearings of the core carriage in the same manner as the arms 43 above referred to and thereby cause the carriage wheels to roll along the supporting track rails 17.

*Cord sheet feeding and cutting mechanism.*

With each of the machine units there is associated a cord sheet feeding and cutting mechanism which is illustrated more particularly in Figs. 5 and 11 to 23 inclusive of the drawings. From reference to Figs. 1, 1ª of the drawings, it will be noted that the cord sheets, generally indicated by the letter C, are alternately fed in reverse directions at an angle of substantially 45° with respect to the longitudinal center line of the machine unit and with relation to the axis of the core or mandrel. These cord sheets are automatically fed and cut into sections of the required predetermined width to extend transversely around and embrace the core or mandrel, means being provided to automatically fold the edge portions of the cord sheet section against the opposite sides of the core during the rolling movement of the latter, as will be hereinafter described. Thus, it will be apparent that during the movement of the core through one of the machine units, the cords composing the cord sheet section will traverse the core in one direction at an angle of 45° with respect to its axis, while the cords of the cord sheet section which is applied in the movement of the core through the next succeeding machine unit will lie in superposed relation upon the previously applied cords but will extend in a reverse direction to the latter cords and at an angle of 45° across the core.

This sheet is of a width equivalent to the circumferential length of the core so that when a section of the cord sheet is applied upon said core, the cords will lie in close relationship over the entire core surface. This cord sheet, as it is drawn from the reel and prior to being fed to the machine unit, is treated so that the individual cords will be coated with rubber which is in what is known as a "tacky" condition.

Between the rails 17 of each machine unit and below the plane thereof, there is suitably mounted and supported a longitudinally extending tank 46, and the cord sheet is drawn or pulled over a table 47 arranged at one side of this tank and in a plane slightly above the upper edges of the tank wheels. The edge of this table next adjacent to the tank is toothed as indicated at 48, and above the table edge a bar 49 is arranged and provided with similar teeth 50 corresponding in number and arrangement with the teeth 48. Vertical rods 51 are connected to opposite ends of the bar 49 and extend downwardly through suitable openings in the table 47, the lower ends of said rods being provided with the plates 52 forming seats for the lower ends of springs 53, the upper ends of which bear against the underside of the table 47. These springs normally act to force the bar 49 downwardly and clamp the end of the cord sheet between said bar and the table 47.

As shown in Figure 11 of the drawings, at the opposite side of the machine from the table 47, there is secured to the underside of the rail 17 adjacent the opposite ends of said rail, the spaced parallel obliquely extending bars 54. These bars are of inverted T shape cross-sectional form and provide guide flanges for a horizontally movable parallelogrammatic frame 55, the opposite ends of said frame having plates 56 secured thereto and overlying said guide flanges. The inner side of the frame 55 is formed with a reduced portion disposed in the plane of the table 47 and having teeth 57 thereon to intermesh with the teeth 48 on the edge of the table. A clamping bar 58 is hingedly mounted at spaced intervals upon the rod or pintle 59 fixed in the frame 55 and is provided on its free edge with the teeth 60 overlying the teeth 57. The bar 58 is provided with an upstanding lug 61 with which one end of a rod 62 is pivotally connected, the other end of said rod being connected to the shorter arm of a bell crank lever 63 pivotally mounted as at 64 upon one end of the frame 55. A spring 65 connected to said lever yieldingly holds the same in a normal position and through the medium of the rod 62 urges the pivoted bar or jaw 58 towards the toothed edge 57 of the frame.

The longer arm of the lever 63 terminates in a laterally projecting lug 66 which is adapted to coact with a pivoted dog 67 mounted upon one of the guide bars 54 beneath the rail 17. A coil spring 68 connected to this dog yieldingly holds the same in a normal position in engagement with a stop pin 69.

In spaced relation to the opposite end of the rail 54, an arm 70 is fixed thereto at one of its ends, the other end of said arm extending downwardly and having an inclined cam edge 71 with which the lug 66 of the lever 63 is adapted to co-operate in the manner hereinafter described.

Figure 16:
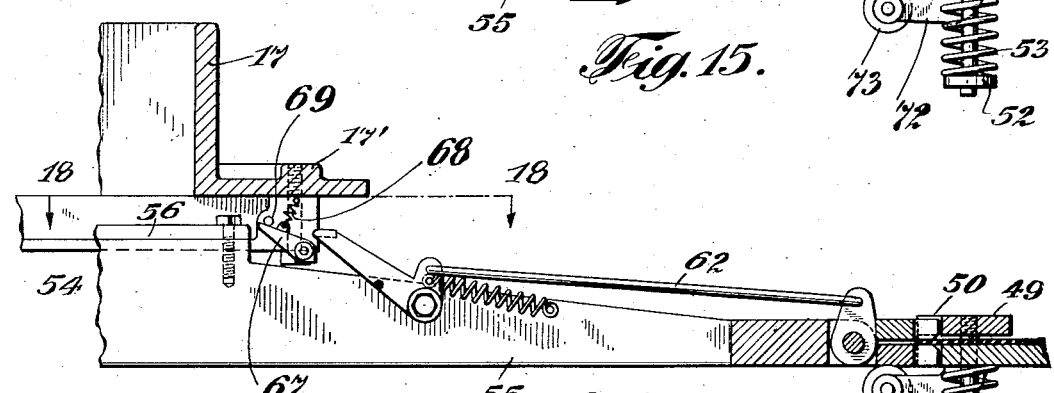
Figure 16 is a similar view showing the further movement of said frame and the gripping or clamping means thereon engaged with the edge of the cord sheet.
Figure 17:
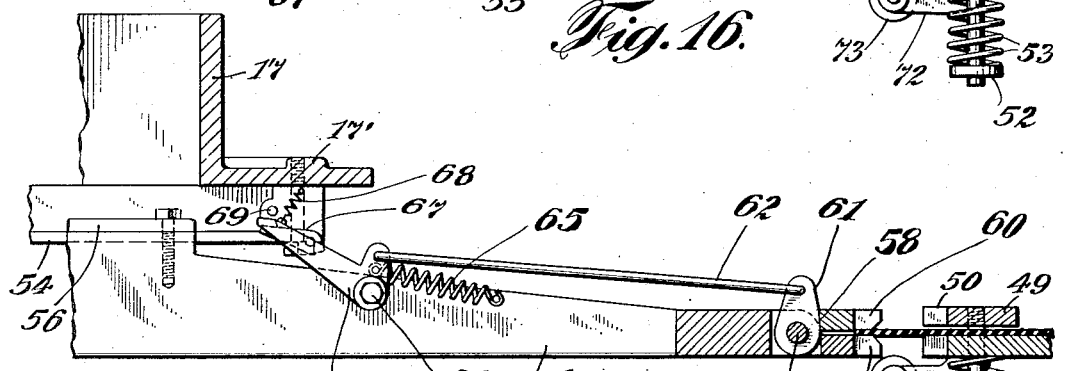
Figure 17 is a similar view, the cord feeding frame moving in the opposite direction from that indicated in Figure 15 and drawing or feeding the cord sheet over the bed plate.
Figure 18:
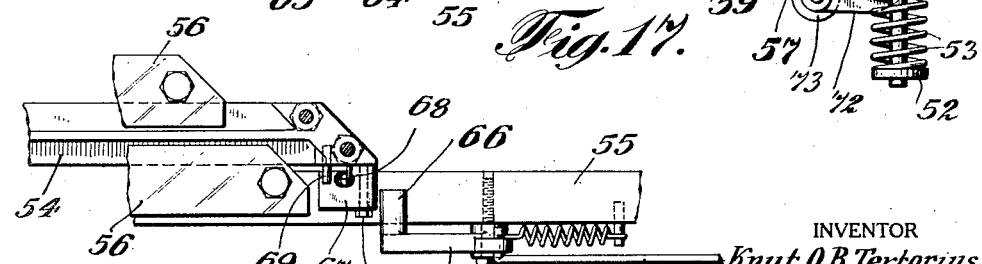
Figure 18 is a detail plan view of the means for actuating the cord sheet gripping or clamping mechanism.

To the underside of the table 47 at its inner edge, a plurality of forwardly projecting bracket arms 72 are secured in each of which a roller 73 is mounted. These rollers are adapted to receive and support the inner side of the frame 55 in the forwardly projected position of the latter as seen in Figure 16 of the drawings. The mechanism for reciprocating this frame will be subsequently described.

Upon the underside of the rail 17 above the table 47, a suitable guide rib 74 is formed upon which the carriage 75 is supported. In this carriage a shaft is journaled having the circular knife blade 76 fixed to one end thereof, said knife blade at its lower portion being disposed closely adjacent the ends of the teeth 48 and 50 on the table 47 of the bar 49 respectively. Upon the other end of the cutter blade shaft a pinion 77 is fixed and meshes with a cog gear 78 loosely journaled upon a stud shaft 79 fixed upon the carriage 75, said gear being provided or rigidly connected with a pinion 80 meshing with the teeth of a rack bar 81 fixed to the outer side of the rail 17.

The carriage 75 at the inner side of the rail 17 is formed with an upstanding lug 82 which is adapted to be engaged by an arm 83 carried by one of the link chains 5. One end of a wire rope or cable 84 is also connected to the carriage 75, said cable being wound upon a drum 85 on one end of a transverse shaft 86. A second drum 87 is fixed to the other end of the shaft and one end of the cable 88 is fixed thereto. This cable is extended upwardly from said drum and is trained around a sheave 89 and connected at its other end to the counter weight 90. As shown in Figure 2 of the drawings, this weight normally acts to wind the cable 84 on the drum 85 and thus retain the carriage 75 and the cutter knife 26 in position at the left hand end of the table 47.

The other or right hand end of the rack bar 81 is downwardly inclined, as shown at 91 in Figure 23 of the drawings, it being understood that the guide rib 74 for the carriage 75 is correspondingly inclined. Thus as the carriage moves downwardly upon this section 91 of the rack 81, the lug 82 thereof is disengaged from the arm 83 on the chain 5, whereupon the gravity movement of weight 90 acts to re-wind the cable 84 on drum 85 and return the carriage 75 and cutter blade 76 to normal position.

In suitable bearings 92 fixed to the underside of the table 47 adjacent its opposite ends, the shafts 93 are journaled to one end of each of these shafts a bell crank lever 94 is fixed, each lever having a short upwardly extending arm and a longer horizontally projecting arm 95. The longer arms are respectively engaged with the lower end of the rods 51 connected to the clamping bar 49, while the shorter arms of these levers are connected by a longitudinally extending bar 96. To the other end of the shaft 93 at the left hand end of the table 47, an arm 97 is fixed, said arm extending upwardly from said shaft and having an obliquely disposed end portion 98. The end of said arm is adapted for engagement by the part 99 of the carriage 75 (see Figure 22), which, at the end of the return movement of said carriage, has a camming action upon the part 98 of the arm 97 and through the medium of the lever arms 95 and bar 96, urges the rods 51 upwardly, thereby lifting the bar 49 out of clamping engagement upon the cord sheet.

For the purpose of cushioning this return movement of the cutter carriage and absorbing shock, I provide a suitable spring bumper indicated at 100. However, it will be understood that any other desired type of shock absorbing device might be provided for this purpose.

Figures 9, 19:
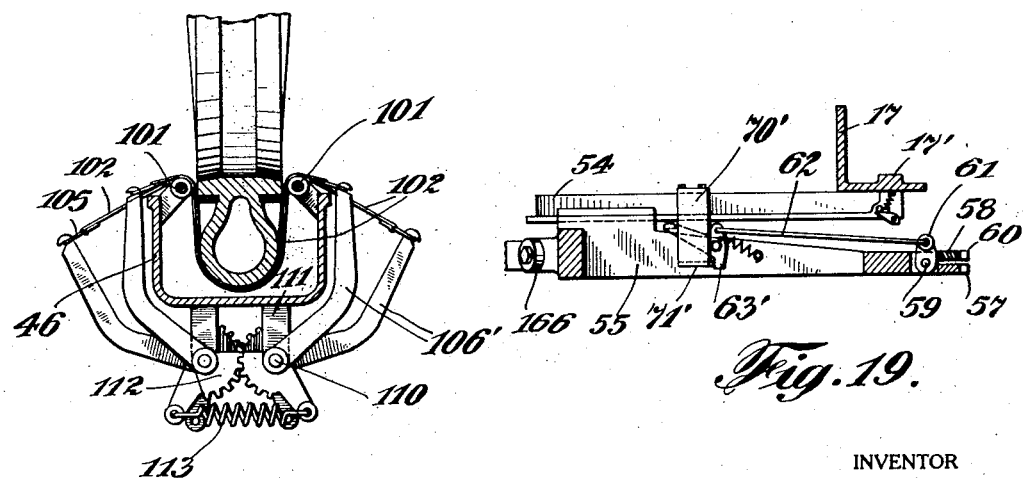
Figure 9 is a transverse section illustrating a slightly modified means for yieldably sustaining the track elements in normal position from that shown in Figure 5 of the drawings.
Figure 19 is a detail sectional view showing the means for actuating the cord sheet clamping means at the end of its feeding movement to release the cord sheet.

In Figure 19 of the drawings I have illustrated another means for actuating the clamping bar 58 to move the same to its released position and which may be preferred over the construction shown in Figure 20. In this alternative construction, the downwardly extending end portion of the fixed arm 70' terminates in an angularly extending lug, indicated at 71', with which a finger 63' projecting downwardly from the pivoted end of the actuating lever for rod 62 is adapted to be engaged. Thus in the retraction movement of the frame 55 to draw the cord sheet over the tank 46, the finger 63' will come into contact with the lug 71' and the bell-crank lever will be actuated to impart a sudden or quick opening movement to the clamping bar or jaw 58, as distinguished from the slower opening movement which would be produced by the end of said lever engaging the cam surface 71 in the construction shown in Figure 20.

*Cord folding and tensioning mechanism.*

Figure 7:
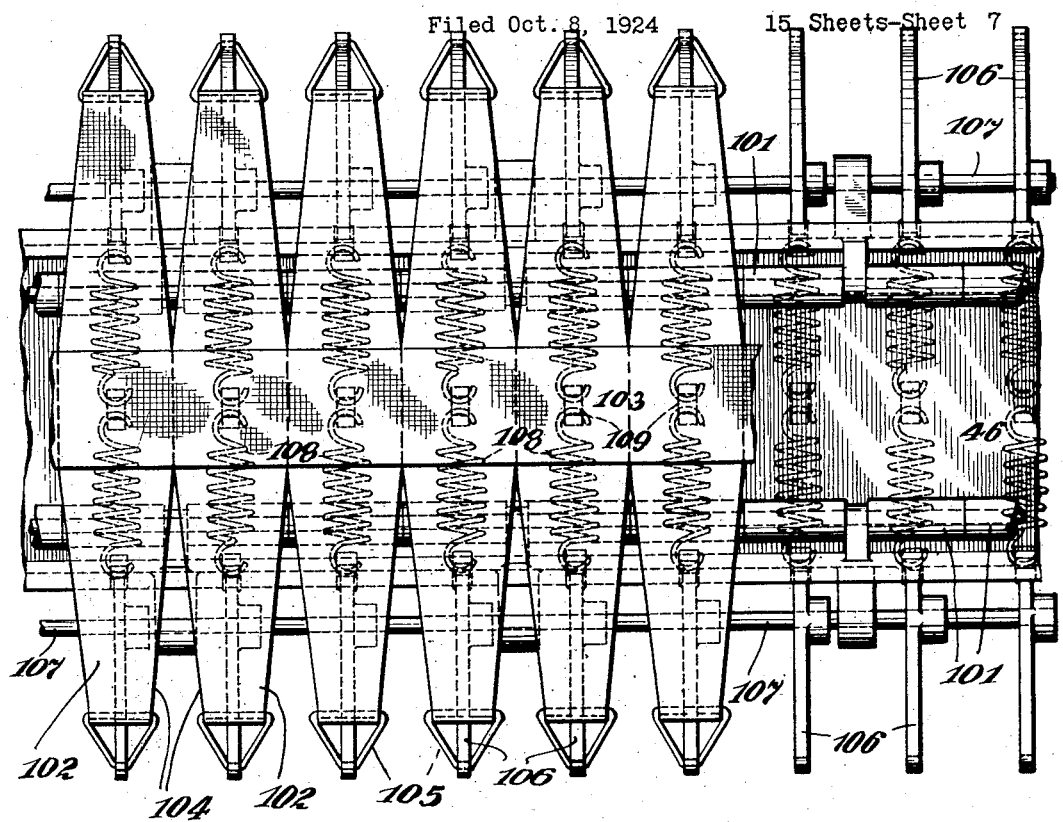
Figure 7 is a fragmentary plan view of the yieldable track for the core.

At the upper edges of the side walls of the tank 46 the rollers 101 are suitably mounted. Over these rollers a plurality of transversely positioned webs 102 are arranged, and the central portions of these webs are connected to each other by a longitudinally extending flexible strip 103. This strip and the webs 102 preferably consist of heavy duck, canvas or other suitable material. The webs 102 gradually taper or decrease in width from the opposite longitudinal edges of the connecting strip 103 to their ends, so that as clearly shown in Figure 7 of the drawings, the side edges 104 of the adjacent webs 102 diverge from each other.

The extremities of the webs 102 are provided with the metal loops 105 which are connected to the upper ends of levers 106, said levers being fulcrumed intermediate of their ends upon rods 107 mounted upon the outer sides of the walls of the tank 46. To the lower end of each lever 106, one end of a coil spring 108 is attached, the other ends of these springs being connected to lugs 109 on the bottom wall of the tank. The springs 108 normally act to throw the upper end portions of the levers 106 outwardly, as shown in Figure 5 of the drawings, and to hold the transverse webs 102 under tension with their intermediate portions extending in a horizontal plane over the top of the tank 46 between the rollers 101.

In Figure 9 of the drawings I have shown a slightly modified form of this part of the apparatus wherein the lower end of each lever 106' extends inwardly beneath the tank and is pivotally mounted upon a rod 110 fixed in depending brackets 111 on the underside of the tank wall. These pivoted ends of the levers are formed with gear segments 112 and the gear segments of corresponding levers at opposite sides of the tank are meshed with each other, said rollers being connected by the springs 113 which operate in the same manner as the springs 108 above referred to, to normally hold the flexible webs 102 under tension, and extending in a horizontal plane across the top of the tank.

As shown in Figure 5 of the drawings, when one of the cores 19 is fed downwardly by the arms 43 on the chains 5, it engages upon the flexible track composed of the transverse webs 102 and the connecting strip 103 and under the weight of the core, the intermediate portion of said flexible track is forced downwardly into the tank 46, it being understood that the cord layer or lamination has previously been fed into position over this flexible track and cut from the cord sheet, as above described. As the transverse webs 102 are drawn over the rollers 101, the end portions of said web fold inwardly and thereby fold the cord layer against the sides of the core, as shown in Figure 5. This action occurs progressively as the core is rolled along the flexible track in substantially the manner illustrated in Figure 8 of the drawings.

For the purpose of applying a proper tension to the cord layers or laminations, I provide a mechanism illustrated more particularly in Figures 24 to 29 of the drawings. The inner edges of the rails 17 are extended horizontally beyond the curved ends 18 thereof, as shown at 114, said inner edges of the rails providing supports for a carriage 115 which, as herein shown, has parallel side bars each provided at its opposite ends with vertically spaced rollers 116 which engage the upper and lower faces respectively, of the rails 114 and also, with the additional horizontally disposed rollers 117 which engage the inner edges of said rails. At one of their ends the side bars of the carriage are provided with upstanding arms 118 for a purpose which will be presently explained.

Upon the other end of the carriage 115, a pair of arms 119 are mounted upon the transversely spaced pivot bolts 120. Each of these arms at one side of its pivot bolt 120 is disposed at an oblique angle in a downward direction, and for a reason which will presently appear, one of these arms is of appreciably greater length than the other. For each of the first three units or sections of the machine or apparatus, cord tensioning rollers 121 of the form shown more particularly in Figure 31 of the drawings, are provided, said rollers being rotatably mounted on pivot studs 122 fixed in the arms 119. It will be noted from reference to Figure 25, that these pivot studs are disposed in radial relation with respect to the core axis but are arranged at different vertical distances from a horizontal plane passing through said axis. This arrangement of the rollers 122 is necessary in order that the rollers operating at opposite sides of the core shall engage upon the same cords at the same time, it being remembered that the cords extend across the core at an angle of substantially 45° with respect to the core axis. Below each of the pivot studs 122, each arm 19 carries a second pivot stud 123 upon which a roller 124 is mounted. These latter rollers also have their axes disposed at different angles with respect to the core axis and are located in different vertical positions relative thereto. These latter rollers operate upon the extreme edges of the cord layers or laminations and press the same against the core flanges as will be later explained. From reference to Figure 25, it will be noted that the axes of both the rollers 121 and 124 are radial with respect to the core and the line of peripheral contact of these rollers with the individual cords will, therefore, extend at an angle with respect to the angle of the cords relative to the axis of the core.

Each of the arms 119 at the opposite side of its pivot 120 has an angularly disposed outwardly projecting end portion 125 to which one end of a rod 126 is pivotally connected. These rods extend inwardly towards each other and support a coiled expansion spring 127 which normally acts to urge the end portions 125 of the arms apart and, therefore, force the other ends of said arms carrying the rollers 121 and 124 inwardly towards each other. This movement of said arms under the action of spring 126, is limited by the shoulders 128 on said arms engaging lugs 129 on the carriage. Each of these end portions 125 of the pivoted arms carries a horizontally disposed roller 130 which is adapted to engage the cam edges 132 of fixed plates 131 suitably mounted above the rail 114 at opposite ends thereof. Thus at the end of the movement of said carriage upon the rails 114 in each direction, as the rollers 131 ride over the cam edges 132 of said plates, the ends 125 of the arms 119 are forced inwardly towards each other against the action of spring 126, thus moving the other ends of said arms with the rollers 121, 124 mounted thereon, in an outward direction.

Between and below the pivotally mounted ends of the arms 119, a peripherally concaved roller 133 is mounted for swinging movement between the lower ends of the arms 134, which are pivotally mounted at their upper ends upon the carriage structure. At their pivoted ends these arms are integrally connected and provided with a downwardly extending lug 135 to which one end of a bolt 136 is connected, said bolt extending through a lug 137 on the carriage. Between said lug and the lug 135, a coil spring 138 surrounds said bolt. This spring acts to yieldingly urge the roller 133 forwardly and into engagement against the intermediate portion of the cord layer covering the tread surface of the core, as will be readily seen from reference to Figure 25 of the drawings.

As is well known in the art, the individual cords composing each layer of the tire are initially loosely connected in spaced relation to each other by relatively light binding threads. In this initial condition of the cord layer, the number of cords constituting the layer are sufficient so that as the layer is wrapped around the core in the manner above explained, the ends of the individual cords move relatively to each other into close contacting engagement at the inner or bead portions of the core, while the intermediate portions of the cords extending over the outer periphery of the core will be spaced from each other. However, under the properly regulated pressure of the roller 133, these intermediate portions of the cords are compressed or flattened out so that they assume an elongated cross sectional form and substantially take up the spaces intervening between the adjacent cords at the periphery of the core. Thus the difference in circumferential length of the core at the periphery thereof and at the bead portions is compensated for and practically the entire surface of the core is covered by the cords which, nevertheless, lie smoothly and without wrinkles upon the core surface.

Assuming that a tire having six plies or layers of cords is to be produced, as represented in Figures 30 to 36 of the drawings, the cord tensioning rollers 139 are provided for the last three units of the machine, said rollers differing from the rollers 121 of the first three machine units in that they are provided with a section of uniform diameter having a flange 140 at the outer end thereof. The reason for this difference in the form of the tensioning rollers which operate upon different cord layers, will be fully explained in connection with the operation of the machine.

Figure 4:
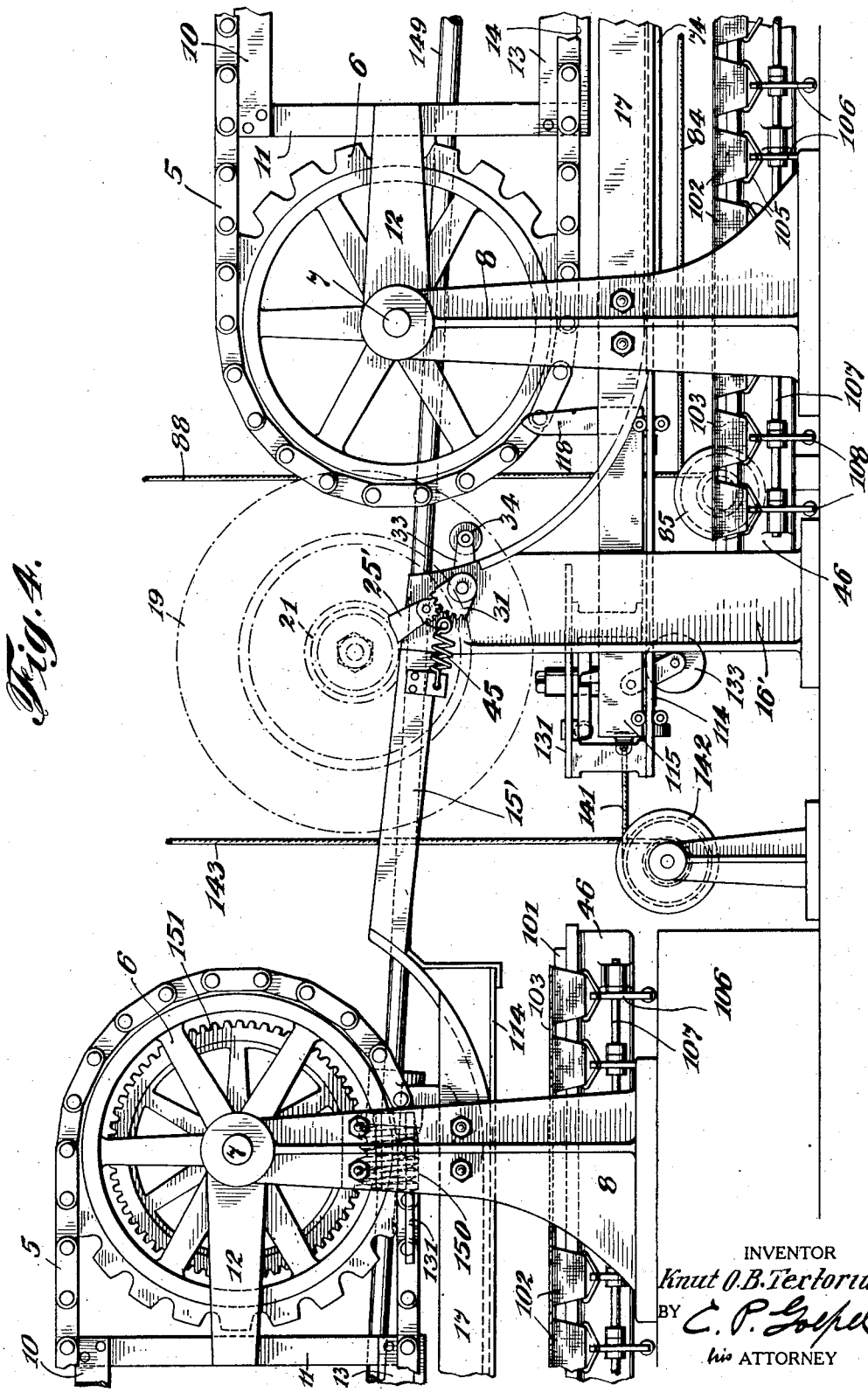
Figure 4 is a fragmentary side elevation of the rear end of one machine unit and the forward end of an adjacent unit and showing the means for controlling the movement of the core to the latter unit.

To each of the traveling carriages mounted upon the rollers 114, one end of a cable 141 is attached, the other end of said cable being wound upon a drum 142 and the drum shaft having a second drum 143 fixed thereto to which a second cable 144 is attached at one end, said latter cable extending over a sheave 145 and having a counterweight 146 on the other end thereof. This counterweight normally acts to rotate the drum 142 to wind the cable 141 thereon and return the carriage to its normal position, as seen in Figure 4 of the drawings. However, any other equivalent means may be provided for this purpose. At the proper time in the operation of each machine unit, the bearings 22 on the carriage axle 20 engage the upstanding arms 118 on the carriage and move said carriage along the rails 114 against the action of the counterweight 146. If desired, instead of providing the above tensioning means on each machine unit, only the third and sixth units of the machine may be provided therewith to tension a plurality of layers of cords at one time.

*Operating mechanism.*

For the operation of the apparatus above described, an electric motor 147 or any other desired primary power source may be provided. The shaft of this motor is connected by gearing 148 with a shaft 149. This shaft may be suitably mounted or supported to extend the entire length of the apparatus or may be provided in a plurality of sections connected by gearing or other suitable power transmission means. From this shaft or shaft sections, the chains 5 of each machine unit are driven, and as shown in the accompanying drawings, said shaft is operatively connected with the right hand sprocket wheel shaft of each machine unit by means of a worm 150 fixed on said shaft and meshing with a large worm gear 151 on the sprocket wheel shaft. As shown in Figures 1ᵃ and 11 of the drawings, this sprocket wheel shaft of each machine unit is extended and has a beveled pinion 152 fixed thereon. This pinion meshes with a beveled gear 153 on one side of an interrupted gear 154 fixed upon a shaft 155 journaled in the upper end of a standard 156. The teeth 157 of this gear 154, as shown in Figure 12 thereof, extend through substantially 90° of its circumference and are adapted to mesh with an interrupted gear 158 fixed upon the shaft 159 journaled in the standard 156. At diametrically opposite points this gear 158 between the toothed sections thereof, is provided with concave seats 160 which receive the smooth or untoothed peripheral face of the gear 154. Fixed upon the shaft 159 or formed integral with the gear 158 at one side thereof, a cog gear 161 is provided and meshes with a pinion 162 fixed upon the shaft 163 journaled in the bearing standard 156. To the opposite ends of this shaft the arms 164 are fixed at one of their ends, rods 165 being pivotally connected to the other ends of said arms and also pivotally connected to the outer side of the frame 55, as shown at 166. Through this train of gearing it will be evident that at the proper times in the operation of the apparatus, the desired reciprocating motion is imparted to the frame 55 whereby the cord sheet is fed over the flexible track and over the tank 46 in the manner above described.

Referring now to Figures 31 to 35 of the drawings, it will be seen that the core 19 has a body portion of the conventional cross-sectional shape or contour of a pneumatic tire casing. This core at its inner circumference and on opposite sides thereof is formed with an outwardly extending continuous annular flange 167 and at the outer side of this flange the body wall of the core is provided with an annular groove or channel 168 therein. In conjunction with this core structure, I employ rings 169 of angular cross-sectional form which are adapted to be detachably or removably engaged in the annular grooves or channels 168 of the core for the proper formation of the beads at the edges of the tire casing in the manner presently referred to.

Operation.

In the operation of the machine or apparatus above described, the tanks 46 are filled substantially to half their capacity with benzine. I find that a kerosene or benzine bath is necessary to prevent the coated cords from adhering to the flexible core track. In order to eliminate the fire hazard incident to the use of benzine, I may construct this flexible track extending over the tank from thin sheets of Monel metal, which, so far as I have been able to discover, is the only material to which the rubber coating solution on the cords will not adhere. However, if the machine units are properly covered by suitable housings provided with vent outlets for the fumes, there will be little danger of ignition of the benzine baths.

The inclined trackways 15 are first filled to capacity with the cores or mandrels each mounted in a carriage and provided with the rings 169. The surface of each core is dusted with soapstone powder, which prevents the tenacious adhesion of the inner cord layer thereto, and if desired, the edges of the flanges 167 and of the rings 169 may be provided with an adhesive solution suitably applied with a brush for the better adherence of the cord layer edges thereto.

When the motor is started the gearing shown in Figure 12, is first operated to move the frame 55 from its normal position to the opposite side of the tank 46 whereby the edge of the cord sheet extending over the table 47 is grasped and upon the return movement of said frame the cord sheet is drawn over and upon the flexible track extending over tank 46. The arm 83 on one of the chains 5 then engages lug 82 on the cutter carriage and moves said cutter along the edge of table 47 to cut off the section of the cord sheet, after which said cutter is returned to its normal position by the counterweight 90. A single ply, layer, or lamination of cords, as it may be variously termed, is thus positioned upon the flexible track and over the tank 46.

Figure 8:
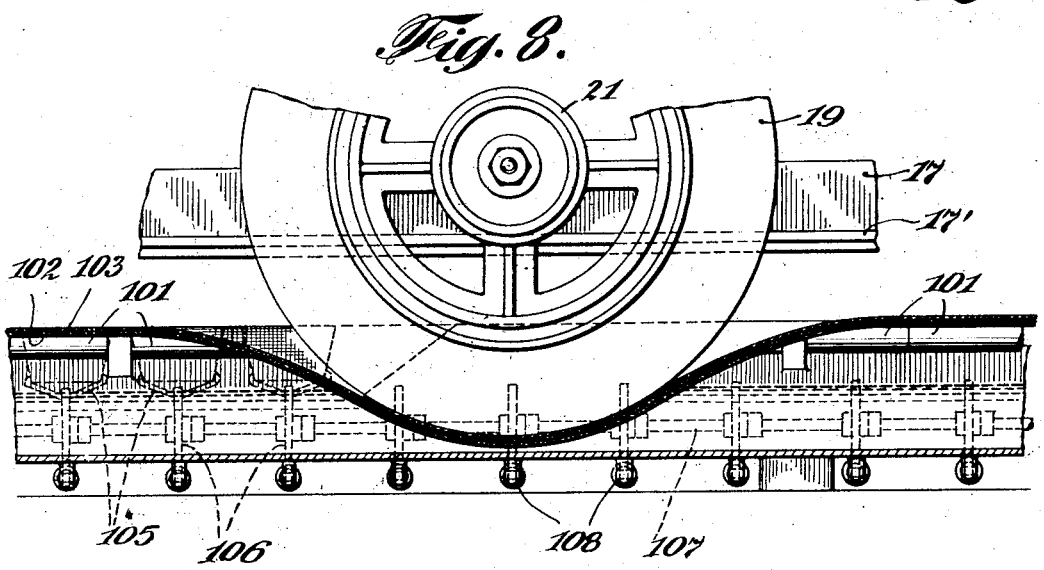
Figure 8 is a longitudinal sectional view thereof.
Figure 15:
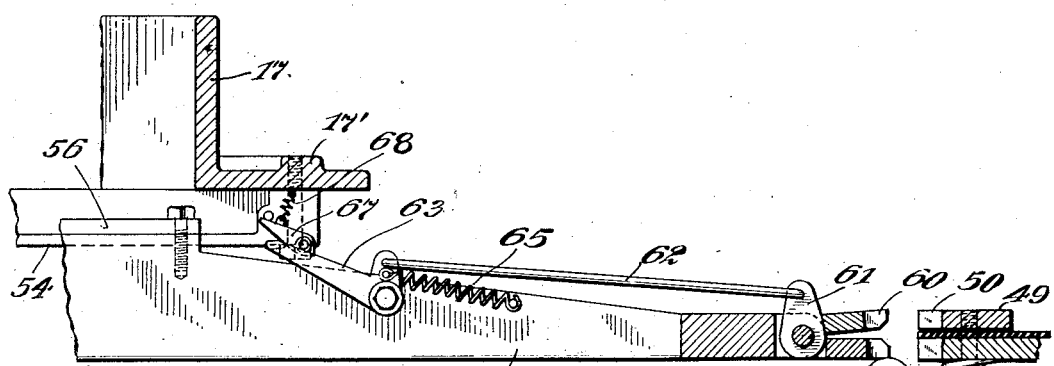
Figure 15 is a sectional view through the movable cord feeding frame showing the means for gripping or clamping the edge of the cord sheet just prior to the limit of its movement in one direction.

The rollers 34 are now engaged by the cam edges 40' of the plates 40 on the chains 5, thus actuating the core holding devices in the manner heretofore explained so that the first core is released and the bearings 22 on the carriage shaft 20 are received in the forked arms 43. The wheels 21 of the core carriage roll freely upon the tracks 17 as the carriage is moved downwardly upon the curved ends 18 of the track rails until the core at its lower portion engages upon one end of the core ply or layer and depresses the same together with the flexible track substantially as seen in Figures 5 and 8 of the drawings. In the continued movement of the core carriage, the core rotates by reason of its frictional contact upon the cord layer, and progressively during the rotation of the core longitudinally of the tank 46, the cord layer and the flexible track are depressed into the benzine bath contained in said tank and the side or edge portions of the cord layer are thus folded upwardly against the opposite sides of the core the opposite ends of the cords constituting said layer being pressed against the core flanges 167 and rings 169, as will be presently referred to. In this manner, the cord ply or layer is automatically applied and positioned upon the core or mandrel during the rolling movement thereof.

It will be understood that after the plates 40 have passed below and out of contact with roller 34, the dogs 25 and 35 return to their normal positions so that the other cores roll downwardly upon the track rails 15 until the carriage wheels thereof engage the respective pairs of dogs 25.

Shortly in advance of the engagement of the periphery of the core upon the end of the cord layer, the lugs 118' on the chains 5 engage the upstanding arms 118 so that the carriage having the tension rollers thereon, is moved along the spaced rails 114. It will be noted from reference to Figure 1 of the drawings that the lower side of the roller 133 is disposed in a plane closely adjacent to the upper surface of the flexible track so that while the side portions of the cord layer at the end thereof still remain between the end portions of the transverse webs 122 of the flexible track, said roller will engage the intermediate portion of the cord layer and press the same against the tread surface of the core. The rollers 124 and 121 operate against the cord layer at opposite sides of the core, and owing to the relative positions of these rollers, the same cords will be engaged thereby at the same time at the opposite sides of the core notwithstanding the 45° angle at which said cords traverse the core surface.

Figure 24:
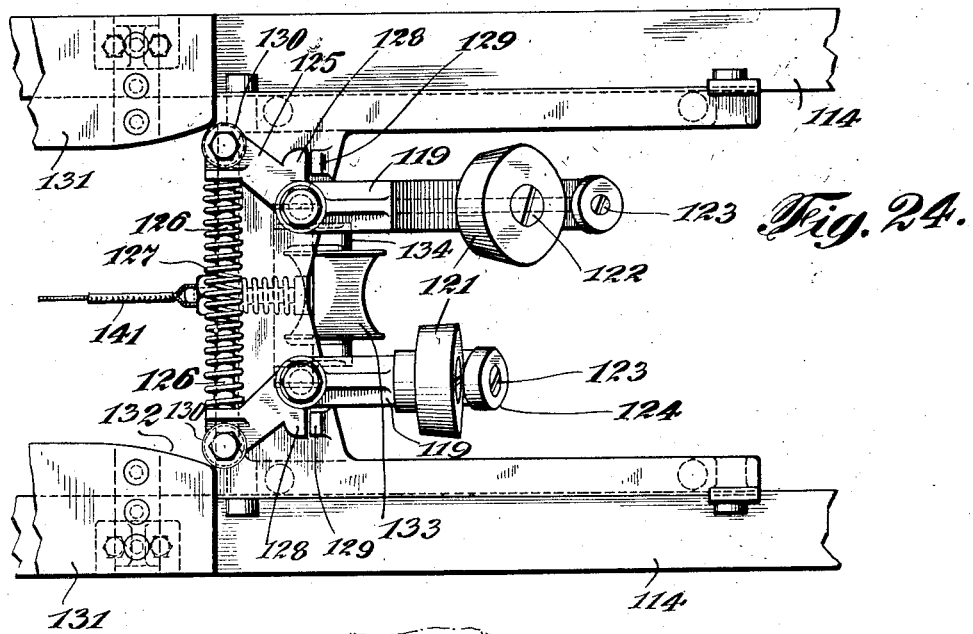
Figure 24 is a plan view of the cord shaping and tensioning means.
Figure 25:
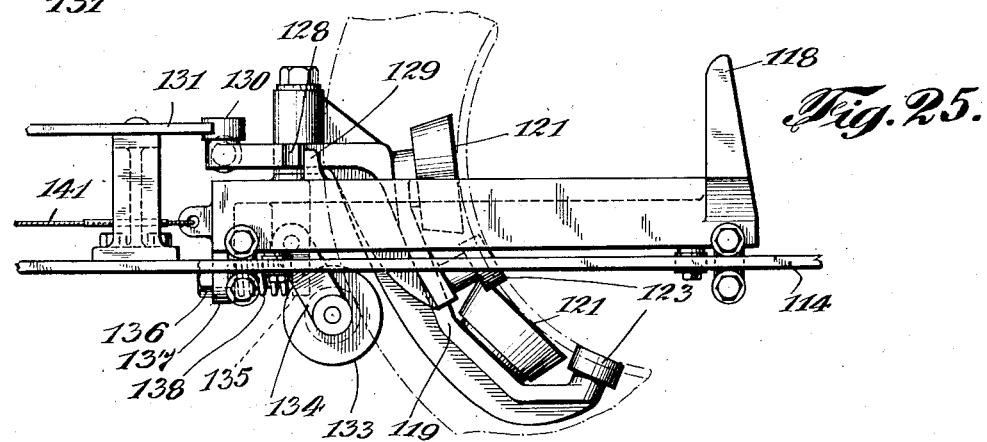
Figure 25 is a side elevation thereof.
Figure 26:
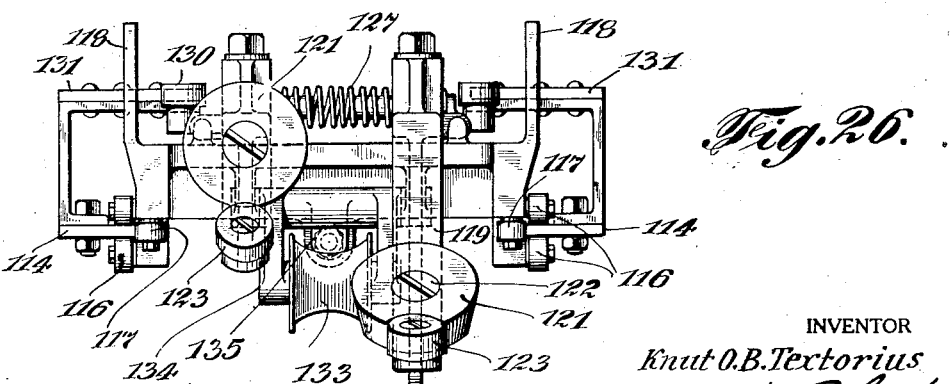
Figure 26 is a front elevation of said mechanism.

As shown in Figure 30 of the drawings, the rollers 124 operate against the ends of the cords, the necessary pressure being applied by the spring 126 so that the cord ends are forced against the edge surfaces of the flanges 167 and the rings 169. Simultaneously, the rollers 121 acting against the same cords at opposite sides of the core, force the cords inwardly beneath the rings 169 and press the same against the narrowed or constricted section of the core body. This operation serves to tension the cords around the core and insures uniformity of tension in all of the cords composing the cord ply or layer. When a complete layer of cords has thus been applied by the first machine unit upon the periphery of the core or mandrel, said core with the cord layer thereon is delivered to the next succeeding machine unit, the carriage wheels supporting the core rolling downwardly by gravity upon the inclined track rails 15' until said carriage engages the stop lugs 25'. These stop lugs are moved to release position by the cam plates 46 on the chains 5 of this section in the manner above described, and the core carriage is received in the forked or recessed plates 43' on said chains and the above described operation is repeated, it being understood that a second cord sheet has been automatically fed over the flexible track at a reverse angle from the angle of feed of the cord sheet of the first machine unit and a section cut therefrom. In the rolling movement of the core, the cords in this second layer will thus be applied in superposed relation to the first layer of cords on the core and at a reverse angle with respect thereto, said second layer of cords likewise being automatically folded and tensioned by the tensioning rollers associated with the second machine unit in the manner above explained. The apparatus may be provided to apply any desired number of cord layers in this manner. Assuming that a tire casing or carcass having six of such cord layers is to be produced, the first three of the machine units having the tensioning rollers, as shown in Figures 24, 25 and 26, will thus apply and tension the first three layers of cords upon the core. After these first three layers are applied and before the core is delivered to the fourth machine unit for the application of the succeeding cord layer thereto, a bead ring 170 is applied against each side of the superposed cord layers beneath the rings 169 carried by the core. It will be seen from a comparison of Figures 30 and 31 of the drawings that in the operation of the tensioning rollers 121 which force the cords inwardly beneath the rings 169, the end portions of the cords are drawn downwardly while the rollers 124 continue to exert an inward pressure thereon so that the edges of the cord layers extending outwardly from the inner sides of the core rings are of a width substantially equivalent to the thickness of said rings.

After the bead rings 170 have been applied, the edges 171 of the superposed cord layers are detached from the outer faces of the rings 169 and are folded downwardly and inwardly against the outer plane faces 172 of the bead rings. Owing to the adhesive "tacky" condition of the rubber composition on the cords, they will adhere closely to each other and to the rings 170. The inner surfaces 173 of the bead rings are curved substantially in conformity to the curvature of the outer core surface. After the edges of the cord layers have thus been folded over the outer sides of the bead rings to enclose the latter, the rings 169 are removed or detached from the core or mandrel. It will be understood that in so far as the present disclosure is concerned, in order to apply these bead rings 170, the core with its carriage must be removed from the supporting rails 15. However, in a companion pending application filed October 16th, 1924, Serial No. 743,895, I have disclosed a means whereby the bead rings may be supported for movement with the rolling cores and whereby the application of the bead rings after the first three cord layers have been applied without removal of the core from the machine, may be accomplished.

The remaining three units of the machine are provided with tensioning rollers of the character shown in Figures 27 and 28 of the drawings, this being the only respect in which these machine units differ from the first three. As the next or fourth layer of cords is applied in the manner above described, the rollers 124 operating in advance of the rollers 139 hold the extreme edges of the cord layer closely against the faces of the core flanges 167. Immediately following each of the rollers 121, the roller 139 operates upon the cord layer, the straight cylindrical portion thereof pressing the cord layer closely against the previously applied cord layers at the outer side of the bead rings 170. The flange 140 on said roller operating upon the edge of the cord layer beyond the bead ring draws the same from between the roller 124 and the edge face of the core flange 167 and forces the same into the groove or channel 168 at the inner side of the core flange substantially in the manner illustrated in Figure 35 of the drawings. The two succeeding layers of cords are applied in a similar manner as the core passes through the two remaining units of the machine. After the core with the superimposed cord layers thereon is delivered from the last unit of the machine, the rubber sides and tread are applied and the casing or carcass is then stripped from the core, it being understood that the core is of the usual sectional construction which permits of the easy removal of the casing therefrom. The edge portions 174 of the outer three layers of cords which were folded into the grooves 168 of the core are then turned inwardly and downwardly over the inner sides of the beads, as shown in Figure 36 of the drawings. After fabric strips have been applied around the bead eyes of the cord layers, the casing is ready for vulcanization whereby the cords of the several superposed layers are bound together or interlocked with each other and held against relative movement under the initially applied uniform tensioning strain. In this manner, I produce a cord tire casing or carcass possessing superior wearing qualities. I also consider the bead formation of the tire casing to be new in the art. I have found that by turning the edges of the inner laminations of cords outwardly around the bead rings and turning the edges of the outer layers or laminations of cords inwardly around the bead rings over the inner layers of cords, that the beads of the casing or carcass are greatly strengthened and the strains are uniformly distributed on the bead rings with less liability of said rings cutting through the cords of the superposed plies or laminations.

It will be understood that the gear ratios of the mechanism for operating the cord sheet feeding frame, as shown in Figures 11 and 12 of the drawings, are properly predetermined in accordance with the distance between the sprocket centers of the feed chains 5 of each machine unit so that the operations will be properly timed. In the arrangement shown, the distance between the sprocket centers is substantially one and one-half times the circumferential length of the core or mandrel which affords ample time for the feeding and cutting of the cord sheet between the discharge of one core with a cord layer thereon and the automatic feeding of the next core to the machine unit.

From the foregoing description, the novel features of my improved method of building a tire casing or carcass and the embodiment of apparatus which I have selected for purposes of illustrating said method, will be clearly understood. The method consists essentially in rolling the core or mandrel in contact with a ply or lamination of sufficient length and width to cover the core surface and progressively during such rolling movement of the core, folding the edge portions of said ply or lamination against the opposite sides of the core. A further important feature of the method is to apply the tensioning strain upon the individual elements of which the ply or lamination is composed concurrently with the inward folding of said ply or layer against the sides of the rolling core. In so far as I am aware, it is entirely new in this art to build or construct a laminated tire casing or carcass in this manner. Further, as illustrated in the accompanying drawings I have devised a machine whereby such operations may be carried out with great expedition, thus materially increasing quantity production of such tire casings, and particularly those wherein the body laminations are composed of individual cords as distinguished from a woven fabric. The prior art methods of making or building cord tires are time-consuming and laborious, and it has also been found quite difficult to secure the desired uniform tension of the cords in all of the superposed plies or laminations. My present improvements not only greatly increase quantity production of such cord tires, but as above explained, enable me to produce a tire casing or carcass which in itself embodies novel structural features rendering the same superior in wearing qualities and wherein the cords are positioned and held under substantially uniform tension whereby uniform resistance to strains and the effects of heating is attained.

It will further be seen that the core or mandrel upon which the tire structure is built, in combination with the rings 169, is a novel improvement in the art, as well as the manner or method of forming the base portions or bead edges of the tire casing or carcass with particular reference to which the new core structure is devised.

It will be appreciated that though my new method as herein disclosed is inherent in the operation of the illustrated apparatus, many features of this method might nevertheless be carried out in practice with other machines or apparatus hereafter devised, and accordingly, the method as herein claimed is not necessarily to be limited to the particular apparatus disclosed. Likewise, the several structural features of the apparatus may be susceptible of embodiment in various alternative forms. Therefore, I do not consider myself to be limited to the several detail features of this apparatus either for the purpose of carrying out the method herein described, or other methods analogous thereto, except in so far as the subjoined claims express such limitations, or as otherwise necessitated by the prior art.

I claim:

1. A method of building a tire casing composed of a plurality of superimposed cord layers which consists in arranging a layer of cords of sufficient length and width to provide a circumferentially continuous lamination upon a longitudinally and transversely flexing support and then positioning a vertically disposed tire forming core upon said support and the layer of cords thereon to depress the support under the weight of the core, and imparting a longitudinal rolling movement to said core upon the support whereby the cord layer is progressively folded around said core.

2. A method of building a tire casing composed of a plurality of superimposed cord layers which consists in arranging a layer of cords of sufficient length and width to provide a circumferentially continuous lamination upon a longitudinally and transversely flexing support and then positioning a vertically disposed tire forming core upon said support and the layer of cords thereon to depress the support under the weight of the core and imparting a longitudinal rolling movement to said core upon the support whereby the cord layer is progressively folded around said core and during the rolling movement of the core successively applying a tensioning strain upon the opposite ends of the individual cords.

3. A method of building multi-ply tire casings which consists in feeding a series of spaced sheets of tire building material in the path of travel of a vertically disposed rolling tire forming core, cutting a section from each of said sheets of sufficient width to extend around the core, and rolling the core successively over said sections and folding said sections upon opposite sides of the core to thereby produce a laminated tire structure consisting of the superposed sections or layers of tire building material substantially conforming in shape to the cross-sectional contour of the core.

4. In a cord tire building machine, a series of units each having means for imparting a travelling rolling movement to a tire forming core, and means for automatically applying and tensioning a layer of tire building material upon said core during its travelling movement through each of the machine units.

5. In a cord tire building machine, a series of units each having means for imparting a travelling rolling movement to a tire forming core, means for automatically applying and tensioning a layer of tire building material upon said core during its travelling movement through each of the machine units, and means for automatically transferring the core from one machine unit to another.

6. In a tire building machine, a series of machine units each having means for progressively rolling a tire forming core therethrough, means for applying a layer of tire building material upon a tire forming core during its progress through each unit, and means for automatically transferring the core in succession from one unit to another.

7. In a tire building machine, a series of units each having means for imparting progressing rolling movement to a vertically positioned tire forming core, means for automatically feeding the cores to the first of the machine units, means associated with each of said units for folding and tensioning a layer of tire building material upon the core during its progress therethrough, and means for automatically transferring the core in succession from one unit to another.

8. In a tire building machine, means for imparting a progressing rolling movement to a vertically positioned tire forming core, means for feeding a layer of tire building material and positioning the same in the path of movement of said core, a support for a plurality of cores, and means for automatically feeding the cores in succession from said support for progressively rolling movement over the layers of tire building material.

9. In a tire building machine, means for supporting a layer of tire building material in a horizontal plane, means for progressively rotating a vertically positioned core or mandrel in contact with said layer of material, and means for folding said layer around and upon the core during the rotating movement thereof.

10. In a tire building machine, yieldable means for supporting a layer of tire building material in a horizontal plane, said supporting means adapted to yield under the weight of a core or mandrel vertically positioned thereon and rotatably advanced toward one end thereof, parts advancing with the core and operating to progressively fold said layer of tire building material around and upon the opposite sides of the core during the advance movement of said core.

11. In a cord tire building machine, a yieldable track adapted to impart rolling movement to a vertically positioned core during its advance toward one end thereof, means for feeding a layer of tire building material upon said track in the path of movement of the core, said track yielding under the weight of the core and operating to progressively fold the layer of tire building material around and upon the opposite sides of the core during the advance movement of the latter over said track.

12. In a tire building machine, a yieldably supported track adapted to impart rolling movement to a vertically positioned core, means for feeding a sheet of tire building material over and upon said track, means for cutting a section from said sheet of sufficient length and width to entirely cover the surface of the core, said track yielding under the weight of the core and progressively folding said section of the sheet of tire building material around and upon opposite sides of the core during the rolling movement of said core over the track.

13. In a tire building machine, a flexible track, means yieldingly holding said track normally under tension in a horizontal plane, means for automatically feeding a sheet of tire building material over and upon said track and severing a section of predetermined width therefrom, and means for moving a rotatably supported core longitudinally upon said track and over the section of tire building material whereby rolling movement is imparted to said core, said track yielding under the weight of the core and operating to progressively fold said section of tire building material around and upon the opposite sides of the core during the rolling movement thereof.

14. In a tire building machine, a yieldable track, means normally holding said track under tension in a horizontal plane, a carriage mounted to travel longitudinally above said track, said carriage having means for revolvably supporting a core for rolling movement upon said track, and means for positioning a layer of tire building material upon said track in advance of the core, said track yielding under the weight of the core and operating to fold said layer progressively around and upon the opposite sides of the core during the rolling movement thereof.

15. In a tire building machine, a horizontally positioned trough open at its top, a flexible track extending over the top of said trough, means mounted upon the trough walls and connected to said track to normally tension the same in a horizontal plane, means for feeding a layer of tire building material over and upon said track, and means for supporting a core or mandrel for rolling movement on said track and over the layer of tire building material, said track yielding under the weight of the core and operating to progressively fold said layer around and upon opposite sides of the core during the rolling movement thereof.

16. In a tire building machine, a support to receive a layer of tire building material, means for feeding a sheet of tire building material transversely over and upon said support, said means including a transversely reciprocating frame having means to grip the edge of the sheet, means for automatically actuating said gripping means, and a reciprocating cutter mounted at one side of said support to sever the section of the sheet positioned upon said support and provide a layer of tire building material for application to a tire forming core.

17. In a tire building machine, mechanism for automatically positioning a layer of tire building material for application to a tire forming core comprising a table to receive a sheet of such material drawn from a reel, means to engage the edge of the sheet and position a section thereof of predetermined width beyond one edge of the table for application to a tire forming core, and an automatically actuated reciprocating cutter mounted above said edge of the table to cut said section from the sheet of tire building material.

18. In a tire building machine, means for positioning a layer of tire building material for application to a tire forming core, comprising a table over which a sheet of such material is drawn from a reel, means to engage the edge of said sheet and draw a section thereof beyond one edge of the table to a position for application to the tire forming core, means for clamping the sheet upon said edge of the table, a reciprocating cutter mounted above said table to cut off said section from the sheet, and means automatically actuated at the end of the movement of said cutter in one direction to operate said clamping means and release the sheet of tire building material for movement over said table.

19. In a tire building machine, means for automatically feeding a sheet of tire building material, means for cutting a section thereof from said sheet to provide a layer of material for application over a tire forming core, and means rendered automatically operative by the weight of the core upon positioning said core upon said layer of material to fold said layer of material around and upon the opposite sides of the core.

20. In a cord tire building machine, a movable support for a layer of tire building material automatically operating upon positioning a tire building core upon the layer of material to fold said layer of material around and upon the opposite sides of the core while the core advances toward one end thereof.

21. In a cord tire building machine, means for folding a layer of tire building material around a tire forming core, comprising a horizontally positioned movable support to receive a layer of tire building material, and means normally holding the support against movement and yielding under the weight of a tire forming core positioned thereon, whereby said movable support is rendered automatically operative to fold the layer of tire building material around the core during its advance toward one end of the support.

22. In a cord tire building machine, means for folding a layer of tire building material around a tire forming core comprising a movable horizontally positioned support to receive a layer of tire building material of sufficient length to extend entirely around the core circumferentially thereof, said support embodying a series of relatively movable flexibly connected parts, and means connected with each of said parts and yieldingly holding the same in normal position to permit of their successive movement under the weight of the core in the longitudinal rolling movement of said core upon the layer of material whereby said layer is progressively folded around and upon the opposite sides of the core.

23. In a cord tire building machine, means for folding a layer of tire building material around a tire forming core comprising a yieldingly supported flexible structure normally positioned in a horizontal plane adapted to be progressively depressed during the advance of the tire forming core toward one end thereof and automatically operating to progressively fold a layer of tire building material positioned on said structure around and upon the opposite sides of the core.

24. In a tire building machine, means for folding a layer of tire building material around a tire forming core, comprising a movably supported flexible structure having a plurality of transverse flexible elements centrally connected by a longitudinal flexible element, means connected to the ends of said transverse elements and yieldingly holding said structure under tension in a horizontal plane, said structure adapted to be progressively depressed in the rolling movement of a tire forming core thereover and automatically acting to fold a layer of tire building material positioned thereon around and upon the opposite sides of the core.

25. In a cord tire building machine, means for progressively folding a layer of tire building material around and upon a tire forming core during the rolling movement thereof, and means movable with the core and operating upon the corresponding parts of the layer of material at opposite sides thereof to apply a tensioning strain to said material.

26. In a cord tire building machine, means for progressively folding a layer of tire building material around and upon a tire forming core during the advance movement thereof, a carriage movable with the advance of the core at the rear side thereof and a plurality of tension applying members mounted upon said carriage and relatively positioned at opposite sides of the core to apply a uniform tensioning strain to all parts of the layer of tire building material.

27. In a tire building machine, means for rotatably advancing a vertically positioned tire forming core toward one end of a horizontally positioned layer of tire building material and progressively folding said layer around and upon opposite sides of the core, a carriage, means for moving said carriage and maintaining the same in predetermined relation to the advancing core, and a plurality of tensioning devices mounted on said carriage and simultaneously operating upon different parts of said layer of tire building material to apply a uniform tensioning strain thereto.

28. In a tire building machine, means for rolling a vertically positioned tire forming core over a horizontally positioned layer of tire building material and progressively folding said layer around and upon opposite sides of the core, a carriage, means for moving said carriage and maintaining the same in constant relation to the rolling core, two pairs of spring pressed rollers mounted on said carriage and operating respectively at opposite sides of the core, one roller in each pair engaging one side edge of the layer of tire building material to press the same against the core and the other roller thereof engaging said material outwardly of its edge portion to apply a tensioning strain thereto.

29. In a tire building machine, means for rolling a vertically positioned tire forming core over a horizontally positioned layer of tire building material and progressively folding said layer around and upon opposite sides of the core, a carriage, means for moving said carriage and maintaining the same in constant relation to the rolling core, two pairs of spring pressed rollers mounted on said carriage and operating respectively at opposite sides of the core, one roller in each pair engaging one side edge of the layer of tire building material to press the same against the core and the other roller thereof engaging said material outwardly of its edge portion to apply a tensioning strain thereto, and an additional spring pressed roller mounted on said carriage and pressing the intermediate portion of said layer of material against the circumferential tread surface of the core.

30. In a machine for building cord tires, means for rotatably advancing a vertically positioned core over and toward one end of a layer or ply of cords of sufficient length to extend entirely around the core, the individual cords extending at an angle of approximately 45° relative to the core axis, a carriage, means for moving said carriage in predetermined relation to the core during its advance movement, and tensioning devices mounted upon said carriage and operating upon the ends of the cords during the advance movement of the core to apply a uniform tensioning strain to said cords.

31. In a tire building machine, means for imparting rolling movement to a vertically positioned core over a horizontally disposed layer of tire building material and progressively folding said layer of material around and upon opposite sides of the core, a carriage mounted for horizontal traveling movement with the core, a plurality of spring pressed tensioning devices mounted upon said carriage at opposite sides of the core to apply a tensioning strain upon the said edges of the layer of tire building material, means for moving said carriage in one direction and in constant relation to the rolling core, means for moving the carriage in the opposite direction and returning the same to a normal position, and cam means at each end of the path of travel of said carriage to co-act with said tensioning devices and move the same from their normal positions out of co-operative relation with the core.

32. In a tire building machine, a track, a vertically positioned core, means to advance the core toward one end of the track to impart a rolling movement to the core.

33. In a tire building machine, a vertically positioned core, a track, a core supporting carriage, rails for the carriage, means to advance the carriage toward one end of the track to impart a rolling movement to the core, and automatically actuated means for disengaging the advancing means from the core carriage.

34. In a tire building machine, means for imparting rolling movement to a vertically positioned core including a track, a core supporting carriage, rails for said carriage, means to releasably engage the carriage and move the same along said rails, and means for automatically controlling the movement of a series of core carriages and singly feeding the same to said releasable means.

35. In a tire building machine, means for imparting rolling movement to a vertically positioned core including a track, a core supporting carriage, rails for said carriage, means to releasably engage the carriage and move the same along said rails, means for supporting a series of core carriages for gravity movement to said last named means, stop means normally positioned in the path of movement of said carriages, and automatically actuated means operatively connected with said stop means and permitting of the successive movement of said carriages at proper predetermined time intervals to a position for engagement by said releasable means.

36. In a tire building machine, means for imparting rolling movement to a vertically positioned core including a track, a core supporting carriage, rails for said carriage, means to releasably engage the carriage and move the same along said rails with the core engaged upon said track, means for supporting a plurality of core carriages for gravity movement to said releasable means, pivoted stop members for each carriage normally holding the same against gravity movement, additional relatively movable stop members operatively connected with the first named stop members for all but one of the carriages on said supporting means, said latter members being normally disposed in inoperative position, an automatically actuated means for simultaneously operating all of said stop members whereby the first named members are moved to inoperative positions and the last named stop members moved to operative positions in the path of all but one of the core carriages whereby the one core carriage is released for gravity movement to said releasably engaging means to be moved thereby over the track, said first named stop members subsequently returning to their normal positions and limiting the gravity rolling movement of the remaining carriages upon said supporting means.

37. In a tire building machine, means for imparting rolling movement to a vertically positioned core including a track, spaced horizontally moving endless chains mounted above said track, a core supporting carriage, rails for said carriage, means on each of the endless chains to releasably engage the carriage and move the same along said rails with the core engaged upon said track, means at one end of said chains to support the core carriage for gravity movement to said releasably engaging means on the chains, pivoted dogs coacting with the core carriage to normally hold the same against rolling movement on said support, means for operating said dogs to release the carriage, and additional means on said chains to engage and actuate said dog operating means.

In testimony that I claim the foregoing as my invention, I have signed my name hereto.

KNUT O. B. TEXTORIUS.